United States Patent
Stagg et al.

(10) Patent No.: US 10,364,852 B2
(45) Date of Patent: Jul. 30, 2019

(54) APPARATUS EMPLOYING SHEAR FORCES TO TRANSMIT ENERGY HAVING FLOW ALTERING STRUCTURES CONFIGURED TO INCREASE HEAT REJECTION FROM A WORKING FLUID AND RELATED METHOD

(71) Applicant: BorgWarner Inc., Auburn Hills, MI (US)

(72) Inventors: Jonathan B. Stagg, Bellevue, MI (US); Samuel E. Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 488 days.

(21) Appl. No.: 15/254,532

(22) Filed: Sep. 1, 2016

(65) Prior Publication Data

US 2017/0130783 A1     May 11, 2017

Related U.S. Application Data

(63) Continuation of application No. 15/091,606, filed on Apr. 6, 2016, now Pat. No. 9,470,278.

(60) Provisional application No. 62/253,652, filed on Nov. 10, 2015.

(51) Int. Cl.
    F16D 35/02     (2006.01)

(52) U.S. Cl.
    CPC .......... *F16D 35/02* (2013.01); *F16D 35/021* (2013.01); *F16D 2250/003* (2013.01); *F16D 2250/0007* (2013.01); *F16D 2250/0023* (2013.01); *F16D 2300/021* (2013.01); *F16D 2300/10* (2013.01)

(58) Field of Classification Search
CPC .... F16D 35/02–35/029; F16D 2300/10; F16D 2300/021
See application file for complete search history.

(56) References Cited

U.S. PATENT DOCUMENTS

| | | |
|---|---|---|
| 3,952,508 A | 4/1976 | Bopp |
| 3,968,866 A | 7/1976 | Leichliter et al. |
| 3,972,399 A | 8/1976 | Bopp |
| 4,013,154 A | 3/1977 | Brown |
| 4,046,239 A | 9/1977 | Tinholt |
| 4,051,936 A | 10/1977 | Crisenbery et al. |
| 4,056,178 A | 11/1977 | Detty |
| 4,064,980 A | 12/1977 | Tinholt |
| 4,076,110 A | 2/1978 | Tinholt |
| 4,103,765 A | 8/1978 | Tinholt |
| 4,116,317 A | 9/1978 | Streeter |
| 4,116,318 A | 9/1978 | Crisenbery et al. |
| 4,132,299 A | 1/1979 | Rohrer et al. |
| RE29,928 E | 3/1979 | Bopp |

(Continued)

*Primary Examiner* — Richard M Lorence
(74) *Attorney, Agent, or Firm* — Harness, Dickey & Pierce, P.L.C.

(57) ABSTRACT

A device that employs shear forces to transmit energy includes an outer housing assembly, a disk, and a reservoir with a working fluid. The disk is received in and rotatable relative to the outer housing assembly. A working cavity is formed between a rotor portion of the disk and the outer housing assembly into which the working fluid is received to create shear forces. A plurality of flow altering structures are disposed on the outer housing assembly and are configured to reduce a thickness of a boundary layer of the working fluid in the working cavity in areas that are local to the flow altering structures.

50 Claims, 17 Drawing Sheets

(56) References Cited

U.S. PATENT DOCUMENTS

| | | | |
|---|---|---|---|
| 4,157,748 A * | 6/1979 | Beaujean | F16D 35/02 |
| | | | 192/113.34 |
| 4,190,139 A | 2/1980 | Tinholt et al. | |
| 4,190,140 A | 2/1980 | Konkle et al. | |
| 4,228,880 A | 10/1980 | Gee | |
| 4,235,322 A | 11/1980 | Sutaruk | |
| 4,238,015 A | 12/1980 | Schmida | |
| 4,246,995 A | 1/1981 | Gee | |
| 4,271,946 A | 6/1981 | Bridge | |
| 4,281,750 A | 8/1981 | Clancey | |
| 4,282,961 A | 8/1981 | Roscoe | |
| 4,305,491 A | 12/1981 | Rohrer | |
| 4,312,433 A | 1/1982 | Bopp | |
| 4,346,797 A | 8/1982 | Bopp | |
| 4,351,425 A | 9/1982 | Bopp | |
| 4,351,426 A | 9/1982 | Bopp | |
| 4,355,709 A | 10/1982 | Light | |
| 4,362,226 A | 12/1982 | Gee | |
| D269,783 S | 7/1983 | Heater | |
| 4,457,417 A | 7/1984 | Light | |
| 4,502,580 A | 3/1985 | Clancey | |
| 4,526,257 A | 7/1985 | Mueller | |
| 4,544,054 A | 10/1985 | Brown | |
| 4,579,206 A | 4/1986 | Velderman et al. | |
| 4,591,037 A | 5/1986 | Bopp | |
| 4,627,523 A | 12/1986 | Light | |
| 4,633,988 A | 1/1987 | Light | |
| 4,633,994 A | 1/1987 | Light | |
| 4,678,070 A | 7/1987 | Light | |
| 4,683,999 A | 8/1987 | Light et al. | |
| 4,705,149 A | 11/1987 | Clancey | |
| 4,828,088 A | 5/1989 | Mohan et al. | |
| 4,846,325 A | 7/1989 | Mohan | |
| 4,874,072 A | 10/1989 | Mohan et al. | |
| 4,898,266 A | 2/1990 | Garrett et al. | |
| 4,898,267 A | 2/1990 | Garrett et al. | |
| 4,949,825 A | 8/1990 | Light | |
| 4,974,712 A | 12/1990 | Brown | |
| 5,025,906 A | 6/1991 | O'Neil et al. | |
| 5,030,865 A | 7/1991 | Rockey et al. | |
| 5,060,774 A | 10/1991 | Takikawa et al. | |
| 5,101,950 A | 4/1992 | Schoenmeyer | |
| 5,152,383 A | 10/1992 | Boyer et al. | |
| 5,152,384 A | 10/1992 | Brown | |
| 5,248,018 A | 9/1993 | Debrabander | |
| 5,511,643 A | 4/1996 | Brown | |
| 5,558,192 A | 9/1996 | Muhlbach et al. | |
| 5,577,555 A | 11/1996 | Hisajima et al. | |
| 5,782,715 A | 7/1998 | Walton et al. | |
| 5,893,442 A | 4/1999 | Light | |
| 5,996,755 A | 12/1999 | Burke | |
| 6,021,747 A | 2/2000 | Gee et al. | |
| 6,085,881 A | 7/2000 | Robb | |
| 6,206,639 B1 | 3/2001 | Light et al. | |
| 6,358,010 B2 | 3/2002 | Light et al. | |
| 6,530,748 B2 | 3/2003 | Light et al. | |
| 6,732,845 B2 | 5/2004 | Tilly et al. | |
| 6,736,195 B2 | 5/2004 | Busch et al. | |
| 6,752,251 B2 | 6/2004 | May et al. | |
| 7,040,545 B2 | 5/2006 | Tilly | |
| 7,044,282 B2 | 5/2006 | Saunders, III | |
| 7,159,702 B2 | 1/2007 | Tilly | |
| 7,178,648 B2 | 2/2007 | Barnum et al. | |
| 7,178,656 B2 | 2/2007 | Pickelman et al. | |
| 7,278,524 B2 | 10/2007 | Boyer | |
| 7,293,636 B2 | 11/2007 | May | |
| 7,503,444 B2 | 3/2009 | Bohan | |
| 7,516,827 B2 | 4/2009 | Pickelman, Jr. et al. | |
| 7,621,386 B2 | 11/2009 | Light | |
| 7,628,262 B2 | 12/2009 | Barnum et al. | |
| 7,650,974 B2 | 1/2010 | Light et al. | |
| 7,913,825 B2 | 3/2011 | Boyer | |
| 7,963,380 B2 | 6/2011 | Light et al. | |
| 7,980,373 B2 | 7/2011 | Boyer | |
| 8,522,945 B2 | 9/2013 | Pickelman et al. | |
| 8,596,438 B2 | 12/2013 | Boyer | |
| 8,602,190 B2 | 12/2013 | May | |
| 8,616,357 B2 | 12/2013 | Boyer | |
| 8,627,936 B2 | 1/2014 | Boyer | |
| 8,978,859 B2 | 3/2015 | Rothoff et al. | |
| 2001/0052410 A1 | 12/2001 | Busch et al. | |
| 2002/0121420 A1 | 9/2002 | Medamaranahally | |

* cited by examiner

APPARATUS EMPLOYING SHEAR FORCES TO TRANSMIT ENERGY HAVING FLOW ALTERING STRUCTURES CONFIGURED TO INCREASE HEAT REJECTION FROM A WORKING FLUID AND RELATED METHOD

CROSS-REFERENCE TO RELATED APPLICATIONS

This application is a continuation of U.S. application Ser. No. 15/091,606 filed Apr. 6, 2016, which claims the benefit and priority of U.S. Provisional Patent Application No. 62/253,652 filed Nov. 10, 2015. The disclosure of each of the above-referenced patent applications is incorporated by reference as if fully set forth in detail herein.

FIELD

The present disclosure relates to an apparatus employing shear forces to transmit energy, such as a viscous fluid clutch, in which the apparatus includes flow altering structures that are configured to increase heat rejection from a working fluid.

BACKGROUND

This section provides background information related to the present disclosure which is not necessarily prior art.

VISCTRONIC® fan drives that are commercially manufactured by BorgWarner Inc. of Auburn Hills, Mich., are examples of devices that employ shear forces on a working fluid to transmit rotary power. In such devices, a relatively high viscosity working fluid, such as a silicone fluid, is transmitted into a working cavity between a disk and an outer housing assembly. The disk is coupled to an input member for rotation therewith, while the outer housing assembly can be coupled to a fan for common rotation. The input member that drives the disk can be driven by a belt of a front engine accessory drive that is driven by an engine's crankshaft. The disk and the outer housing assembly cooperate to form a flow path that is configured to generate shear forces in the working fluid that in turn creates torque that drives (i.e., rotates) the outer housing assembly. The generation of shear forces in the working fluid, particularly when relatively high levels of torque are desired, generates heat in the working fluid.

To aid in rejecting heat from these devices, the outer housing, which is commonly formed of aluminum, can be formed with a plurality of cooling fins. The cooling fins effectively increase the surface area of the exterior surface of the outer housing assembly and increase the ability of these devices to reject heat to the atmosphere via conduction, convection and radiation. The cooling fins, however, do nothing to promote heat transfer from the working fluid to the outer housing assembly.

The heat that is generated when the output housing assembly slips relative to the input member is commonly called "slip heat". The magnitude of "slip heat" generated at a given operational condition is equivalent to the product of the fan torque at that condition and the associated "slip speed" (i.e., the rotational speed differential between input and output members). "Slip heat" is therefore minimal at the extreme conditions of 0% slip and 100% slip. In between these limits, in the region where output to input speed ratio is around 50% to 60%, "slip heat" is generated at its maximum rate. For this worst-case "slip heat" condition, only a small portion of the available working fluid is present in the working cavity; a majority of this smaller portion of fluid resides in the region adjacent the OD of the rotor (disk). This creates a particularly difficult problem to overcome; high "slip heat" magnitude is entering into a relatively small volume of fluid that has a relatively small wetted surface in contact with the walls of the output housing. This problem has been present with all viscous fan drives since the beginning of their usage in automotive engine cooling circa 1950's-1960's.

We understand that a person of ordinary skill in the art would have assumed that "slip heat" is an inherent problem and that the above-described worst case "slip heat" condition simply must be designed around, since the typical fluid shear gap between input and output surfaces is generally very small (approximately 0.4 mm), and it has not been conceivable that high thermal gradients could exist in that tiny shearing region. Recent advances in fluid material understanding have become possible through the utilization of CFD (Computational Fluid Dynamics). In an effort to understand how to optimize our invention to a given viscous fan clutch, we investigated the thermal gradients that exist in the thin fluid shear zone between the disk and the outer housing assembly (which are typically rotating at different rotational speeds). Our investigations of the thermal gradients that exist in the thin fluid shear zone have revealed that completely laminar shear layers are set up that do not effectively transport thermal energy from layer to layer. Furthermore, we observed that the gradient distribution tends to be very non-linear, which we believe to be caused by the non-Newtonian nature of the silicone working fluid that thins with both temperature and shear-rate. We observed this non-linearity to cause the boundary layer adjacent the colder walls of the output housing to be exceptionally thick and thermally insulative.

U.S. Pat. No. 5,577,555 discloses a heat exchanger having a stationary tube that is configured to transmit an aqueous solution (e.g., "a lithium bromide aqueous solution including a surface activating agent"). The tube defines a heat exchange wall having a plurality of "dents" formed therein. The "dents" are described as having a depth that is larger than a thickness of the tube wall and between 0.6-2.0 mm. The size of the tube is not disclosed, but a flow rate of the aqueous solution flowing through the tube is "preferably 0.7-0.25 kg/(m×s)". While the '555 patent does not describe the effect that the "dents" have on the aqueous solution that flows through the tube, it appears to us that the "dents" induce a transition from laminar flow to turbulent flow in a portion of the flow of the aqueous solution that is near the wall of the tube. If an aqueous solution of lithium bromide is assumed to have a density of 1500 kg/m$^3$, a dynamic viscosity of 0.006 Pa·sec, and a mass flowrate of 0.475 kg/sec, and the tube diameter is assumed to be 25 mm, the average flow velocity would be 0.645 m/s. The corresponding Reynolds number is 4031.

In fluid mechanics, a dimensionless quantity known as a Reynolds number is employed to predict flow patterns. The Reynolds number is a ratio of inertial forces to viscous forces and can be calculated by the following formula:

$$Re=(V \cdot L)/v$$

where Re is the Reynolds number, V is the fluid velocity, L is a characteristic length, and v is the kinematic viscosity of the fluid. In a pipe, laminar flow is associated with a Reynolds number that is less than about 2000, turbulent flow is associated with a Reynolds number that is greater than about 4000.

Accordingly, inducement of the transition from laminar flow to turbulent flow in the tube disclosed in the '555 patent appears to be possible due to a relatively high velocity of the aqueous solution (which helps to provide a relatively large numerator in the formula for calculating the Reynolds number) and a relatively low kinematic viscosity of the aqueous solution (which provides a relatively small denominator in the formula for calculating the Reynolds number).

In contrast, the working fluid in the above described fan drives is highly viscous (i.e., the parameter v in the denominator of the formula for the Reynolds number is relatively large). As such, the denominator in the formula for the Reynolds number is relatively large so that the resulting Reynolds number is relatively small so that inducement of turbulence is not possible. For example, a fan drive operating at a 50% slip condition with a slip speed of 1500 rpm in which the disk has a disk radius of 118 mm, a radial shear gap between the disk and the outer housing assembly is 1.2 mm, and a kinematic viscosity of the working fluid is 500 cSt at ambient temperature, the resulting Reynolds number is 44.5, which is significantly below a transition to turbulent flow that begins at Reynolds numbers exceeding 2000.

In view of the above remarks, there remains a need in the art for an apparatus that employs shear forces to transmit energy in which the apparatus is better configured to reject heat from a working fluid where turbulent flow mixing of the thermal boundary layers is not a possibility.

SUMMARY

This section provides a general summary of the disclosure, and is not a comprehensive disclosure of its full scope or all of its features.

In one form, the present teachings provide an apparatus that employs shear forces to transmit energy. The apparatus includes an outer housing assembly, a disk and a reservoir. The outer housing assembly has a working cavity that is bounded by a first annular wall, a second annular wall and a circumferentially extending wall that is disposed between and connects the first and second annular walls. The first annular wall has a plurality of first concentric fluid grooves. The disk is rotatably received in the outer housing assembly and has a rotor portion that is received in the working cavity. The rotor portion has a first side, a second side and an outer circumferential surface. The first side has a plurality of first concentric ribs and each of the first concentric ribs is received in an associated one of the plurality of first concentric fluid grooves. The reservoir has a working fluid therein and is coupled in fluid communication with the working cavity. A working fluid flow path extends between the reservoir and the working cavity and includes a first gap, which is disposed axially between the first annular wall of the outer housing assembly and a first side of the rotor portion, a second gap, which is disposed axially between the second annular wall of the outer housing assembly and a second side of the rotor portion, and a third gap, which is disposed radially between a radially inner surface of the circumferentially extending wall of the outer housing assembly and the outer circumferential surface of the rotor portion. At least one of the first annular wall and the circumferentially extending wall includes a plurality of flow altering structures that are configured to reduce a thickness of a boundary layer of the working fluid adjacent the at least one of the first annular wall and the circumferentially extending wall at locations that are local to the flow altering structures when the disk is rotated relative to the outer housing assembly and a portion of the working fluid is in the working fluid flow path. The reduction in the thickness of the boundary layer of the working fluid is relative to a configuration of the at least one of the first annular wall and the circumferentially extending wall that does not comprise the plurality of flow altering structures.

Configuration of the apparatus in this manner can induce overall mixing of the shear layers to accomplish a more uniform temperature gradient throughout the shear zone and/or can thin the boundary layer on the relatively colder wall of the outer housing assembly when the apparatus transmits rotary power through an ultra-high viscosity, non-Newtonian shear-thinning and temperature-thinning working fluid at a relatively high shear rate in a relatively thin shear gap under flow conditions that are associated with completely laminar flow (i.e., Reynolds numbers that are significantly less than 500).

The flow altering structures can comprise cavities formed in the radially inner surface of the circumferentially extending wall, each of the cavities extending radially outwardly of the radially inner surface of the circumferentially extending wall. Each cavity can have a radially outward wall that is at least partly concentric with the radially inner surface of the circumferentially extending wall.

Each of the cavities can have a pair of end segments that are disposed on opposite sides on a radially outward wall such that at least a portion of one of the end segments tapers between the radially outward wall and the radially inner surface of the circumferentially extending wall.

Each of the cavities can have a pair of end segments that are disposed on opposite sides on a radially outward wall such that each of the end segments connects the radially outward wall to the radially inner surface of the circumferentially extending wall and at least one of the end segments is defined at least partly by a radius.

Each of the cavities can have a radial depth relative to the radially inner surface of the circumferentially extending wall that is greater than or equal to 0.2 mm and less than or equal to 3.5 mm. The radial depth of the cavities can be greater than or equal to 0.5 mm and less than or equal to 2.8 mm. Preferably, the radial depth of the cavities is greater than or equal to 0.8 mm and less than or equal to 2.5 mm.

A theoretical cylinder can be defined by the radially inner surface of the circumferentially extending wall, wherein the flow altering structures are disposed on the inner surface of the circumferentially extending wall within a contiguous zone. The flow altering structures can be sized and populated in the contiguous zone such that the flow altering structures in the contiguous zone are disposed on at least 50% of the surface area of the theoretical cylindrical surface that lies within the contiguous zone. Preferably, the flow altering structures are sized and populated in the contiguous zone such that the flow altering structures in the contiguous zone are disposed on at least 75% of the surface area of the theoretical cylindrical surface that lies within the contiguous zone.

Each of the cavities can have an aspect ratio that is defined by the equation: $AR=C/R$, where: C is a maximum circumferential length of the cavity measured at the radially inner surface of the circumferentially extending wall; and R is a radial distance between a radially outer-most surface of the cavity and a surface of the rotor portion taken along a line that intersects a rotational axis of the disk; and wherein the aspect ratio is greater than or equal to 0.2 and less than or equal to 4.0. Preferably, the aspect ratio is greater than or equal to 0.25 and less than or equal to 2.75. More preferably, the aspect ratio is greater than or equal to 0.5 and less than or equal to 2.5. Still more preferably, the aspect ratio is greater than or equal to 1.0 and less than or equal to 1.5.

The plurality of flow altering structures can number at least five (5) in quantity that are disposed on the circumferentially extending wall.

At least a portion of the plurality of flow altering structures can be disposed on the circumferentially extending wall such that they are not evenly spaced about the circumference of the circumferentially extending wall.

The apparatus can be configured such that none of the flow altering structures are disposed in a sector of the circumferentially extending wall that spans at least 70 degrees.

The first concentric fluid grooves can each define a flat annular root surface and wherein the flow altering structures can include annular wall cavities formed in the outer housing assembly that intersect at least one of the flat annular root surfaces.

Each of the annular wall cavities can have a cavity sidewall and a cavity bottom wall that is bounded by the cavity sidewall and at least a portion of the cavity bottom wall can be parallel to the at least one of the flat annular root surfaces.

Each of the annular wall cavities can have a pair of opposite circumferential ends and at least one of the circumferential ends can be at least partly defined by a radius at a location where the circumferential end intersects an associated one of the flat annular root surfaces.

Each of the annular wall cavities can have a depth relative to an associated one of the flat annular root surfaces that is greater than or equal to 0.2 mm and less than or equal to 3.5 mm. Preferably, the depth of the annular wall cavities is greater than or equal to 0.5 mm and less than or equal to 2.8 mm. More preferably, the depth of the annular wall cavities is greater than or equal to 0.8 mm and less than or equal to 2.5 mm.

Each of the annular wall cavities can have a cavity sidewall and wherein at least a portion of the cavity sidewall is perpendicular to an associated one of the flat annular root surfaces at a location where the portion of the cavity sidewall intersects the associated one of the flat annular root surfaces.

The flow altering structures on the first annular wall can be disposed within one or more zones in which each of the zones is coincident with an associated one of the flat annular root surfaces and has a planar annular shape or an annular segment shape. The flow altering structures can be sized and populated in the one or more zones such that the flow altering structures in the one or more zones are disposed over at least 50% of the surface area of the one or more zones. Preferably, the flow altering structures are sized and populated within the one or more zones such that the flow altering structures in the one or more zones are disposed on at least 75% of the surface area of the one or more zones.

Each of the annular wall cavities can have an aspect ratio that is defined by the equation: AR=C/R, where: C is a maximum circumferential length of the annular wall cavity measured at an associated one of the flat annular root surfaces; R is a maximum distance between a surface of the annular wall cavity and a surface of an associated one of the first concentric ribs taken parallel to an axis about which the disk rotates relative to the outer housing assembly; and the aspect ratio (AR) is greater than or equal to 0.2 and less than or equal to 4.0. Preferably, the aspect ratio is greater than or equal to 0.25 and less than or equal to 2.75. More preferably, the aspect ratio is greater than or equal to 0.5 and less than or equal to 2.5. Still more preferably, the aspect ratio is greater than or equal to 1.0 and less than or equal to 1.5.

At least a portion of the plurality of flow altering structures can be disposed on the first annular wall such that they are not evenly spaced about the circumference of the first annular wall. For example, the apparatus can be configured such that none of the flow altering structures are disposed in a sector of the first annular wall that spans at least 70 degrees.

The apparatus can optionally include a valve in fluid communication with the reservoir and the working cavity. The valve can be coupled to the disk for rotation therewith.

The working fluid can comprise silicone.

The reservoir can be at least partly defined by the disk.

In another form, the present teachings provide a method that includes: providing an apparatus has an outer housing assembly, a disk and a reservoir, the outer housing assembly has a working cavity, the disk is rotatable in the outer housing assembly, the disk has a rotor portion that is rotatably received in the working cavity, the working cavity is in fluid communication with the reservoir; rotating the rotor within the outer housing assembly to generate a flow of a working fluid through the working cavity and to apply a shear force to the working fluid flowing through working cavity; and inducing movement of the working fluid at a plurality of discrete locations on the outer housing assembly in a direction that is transverse to a boundary layer of the working fluid that is adjacent to a first surface formed on the outer housing assembly.

The first surface can be formed on an annular wall of the outer housing assembly or on a circumferentially extending wall of the outer housing assembly.

If the first surface is a circumferentially extending wall of the outer housing assembly, the method can further include inducing disturbances in a laminar flow of the working fluid in a second area that is adjacent a second surface of the working cavity as the working fluid passes through the working cavity during operation of the apparatus. The second surface can be formed on an annular wall of the outer housing assembly.

The method can further include forming a plurality of flow altering structures on the outer housing assembly. The flow altering structures can be unitarily formed with a portion of the outer housing assembly that defines a plurality of concentric fluid grooves.

The flow altering structures can be formed as cavities.

The method can further include casting at least a portion of the outer housing assembly such that at least a portion of the cavities are formed on the portion of the outer housing assembly when the portion of the outer housing assembly is cast.

The locations on the outer housing assembly can be where the flow of the working fluid through the working cavity has a Reynolds number that is less than 100.

The method can further include removing material from a portion of the outer housing assembly to form at least a portion of the cavities. Material can be removed from the portion of the outer housing assembly in an operation selected from a group consisting of: milling, drilling, etching, broaching, and electro-discharge machining.

The method can further include forming a portion of the outer housing assembly in an operation selected from a group consisting of: stamping, embossing, forging, fine blanking and knurling to form one or more flow altering structures.

In another form, the present teachings provide an apparatus that includes an outer housing assembly, a disk that is rotatable in the outer housing assembly and a reservoir. The outer housing assembly has a working cavity that is bounded by a first annular wall, a second annular wall and a circumferentially extending wall that is disposed between and connects the first and second annular walls. The first annular wall has a plurality of first concentric fluid grooves. The second annular wall has a plurality of second concentric fluid grooves. The disk has a rotor portion that is received in the working cavity. The rotor portion has a first side, a second side and an outer circumferential surface. The first side has a plurality of first concentric ribs and the second side has a plurality of second concentric ribs. Each of the first concentric ribs is received in an associated one of the plurality of first concentric fluid grooves. Each of the second concentric ribs is received in an associated one of the plurality of second concentric fluid grooves. The reservoir has a working fluid therein and is coupled in fluid communication with the working cavity. A working fluid flow path extends between the reservoir and the working cavity and includes a first gap, which is disposed axially between the first annular wall of the outer housing assembly and a first side of the rotor portion, a second gap, which is disposed axially between the second annular wall of the outer housing assembly and a second side of the rotor portion, and a third gap, which is disposed radially between the circumferentially extending wall of the outer housing assembly and the outer circumferential surface of the rotor portion. At least one of the first annular wall and the circumferentially extending wall comprises a plurality of flow altering structures that are configured to promote disturbances in a laminar flow of the working fluid in an associated one or ones of the first and third gaps in areas local to the flow altering structures when the disk is rotated relative to the outer housing assembly and a portion of the working fluid is in the working fluid flow path.

In still another form, the present teachings provide a method that includes: providing an apparatus having an outer housing assembly, a disk and a reservoir, the outer housing assembly having a working cavity, the disk being rotatable in the outer housing assembly, the disk having a rotor portion that is rotatably received in the working cavity, the working cavity being in fluid communication with the reservoir; and inducing disturbances in a laminar flow of a working fluid in a first area that is adjacent a first surface of the working cavity as the working fluid passes through the working cavity during operation of the apparatus.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 19:
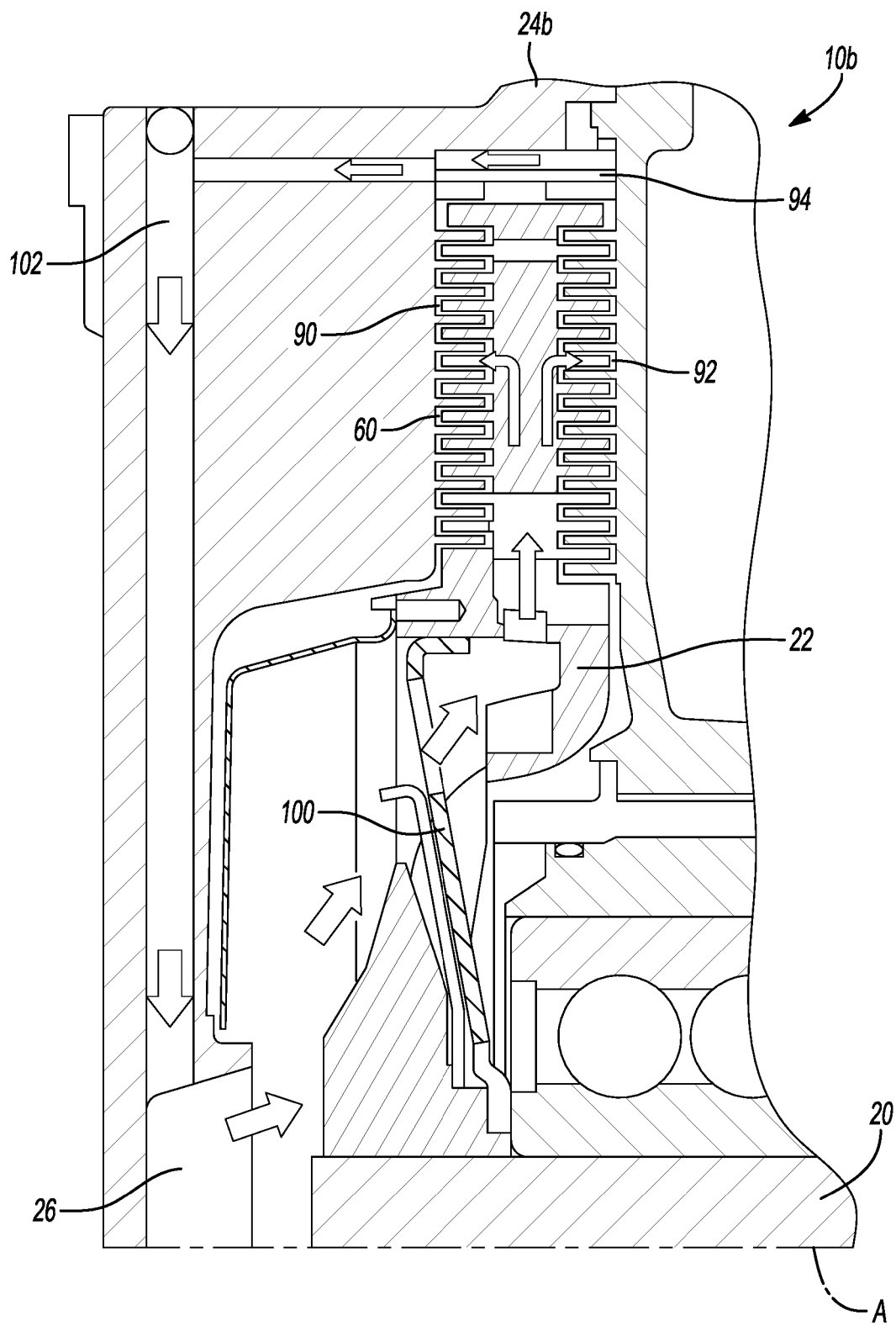
FIG. 19 is a portion of a longitudinal section view of a viscous fan clutch that employs the outer housing assembly of FIG. 17.
Figure 21:
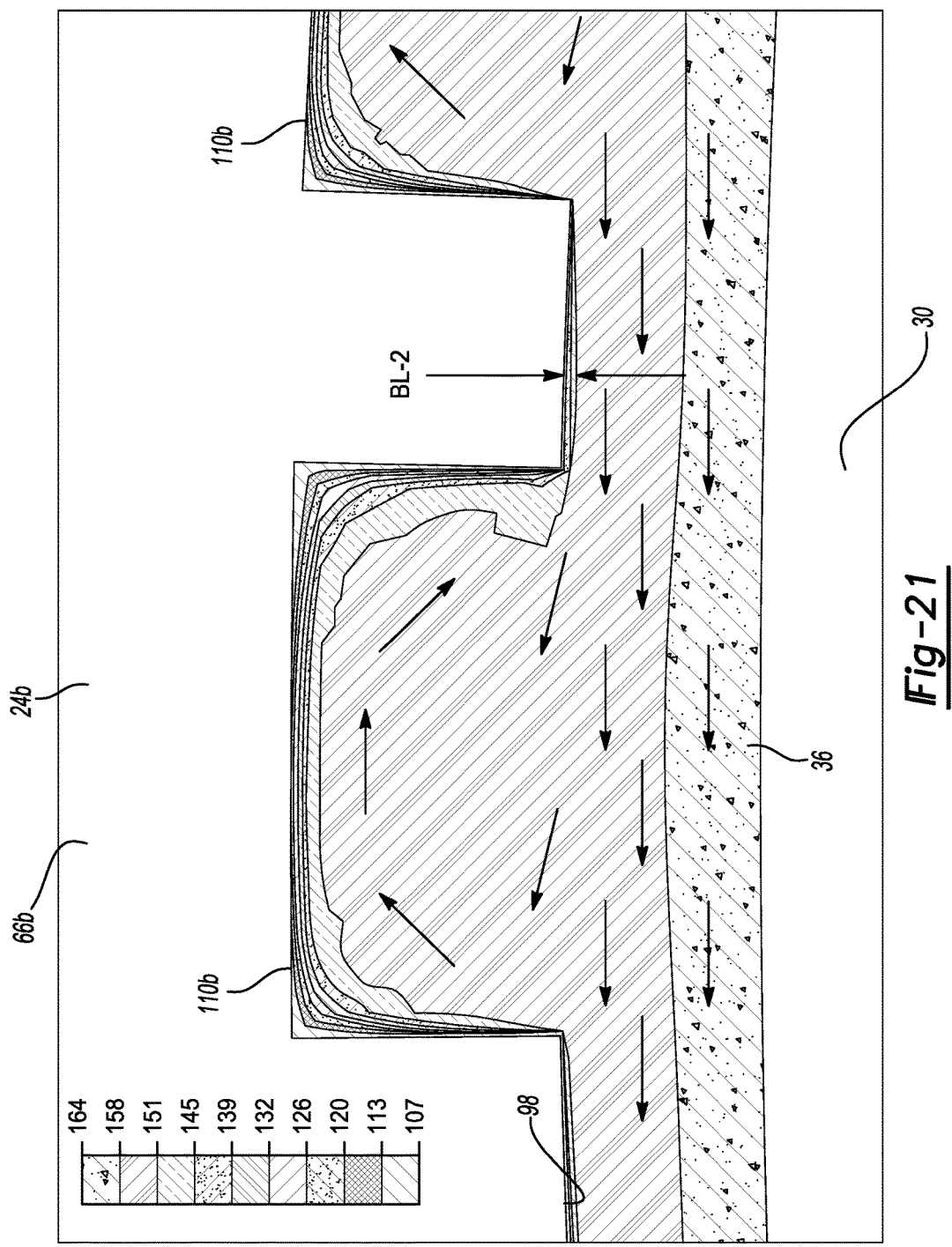
Figure 22:
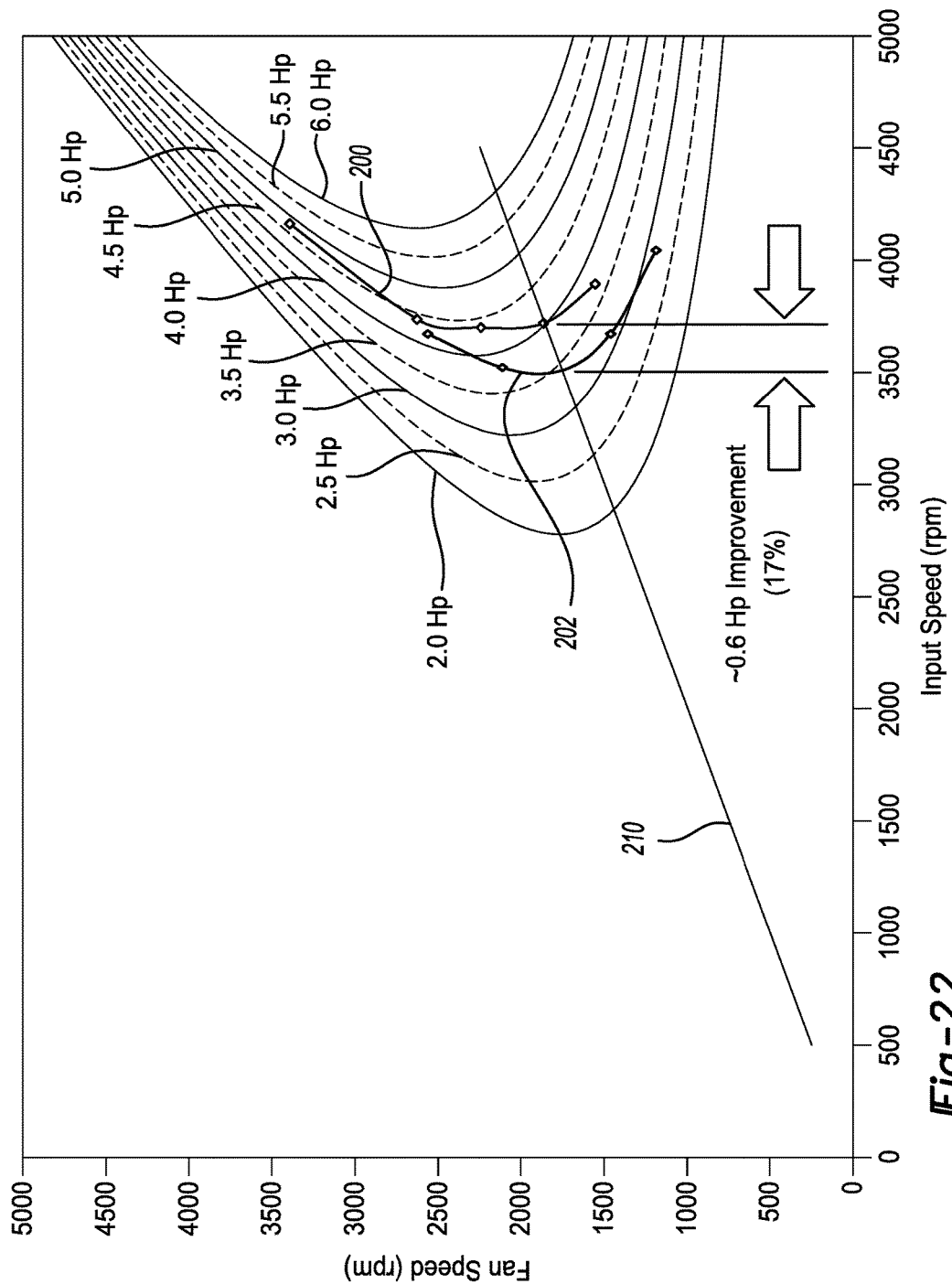

FIG. 21 is a schematic illustration of a portion of the viscous fan clutch of FIG. 19 depicting a working fluid in a gap between a disk and the outer housing assembly, the working fluid forming a relatively thin boundary layer adjacent the outer housing assembly; and FIG. 22 is a plot that depicts isothermal combinations of input and output speed for a prior art viscous fan clutch and the viscous fan clutch of FIG. 19 to a predetermined maximum temperature in which the temperature of a working fluid in these clutches is limited to a predetermined temperature.

Corresponding reference numerals indicate corresponding parts throughout the several views of the drawings.

DETAILED DESCRIPTION

Figure 1:
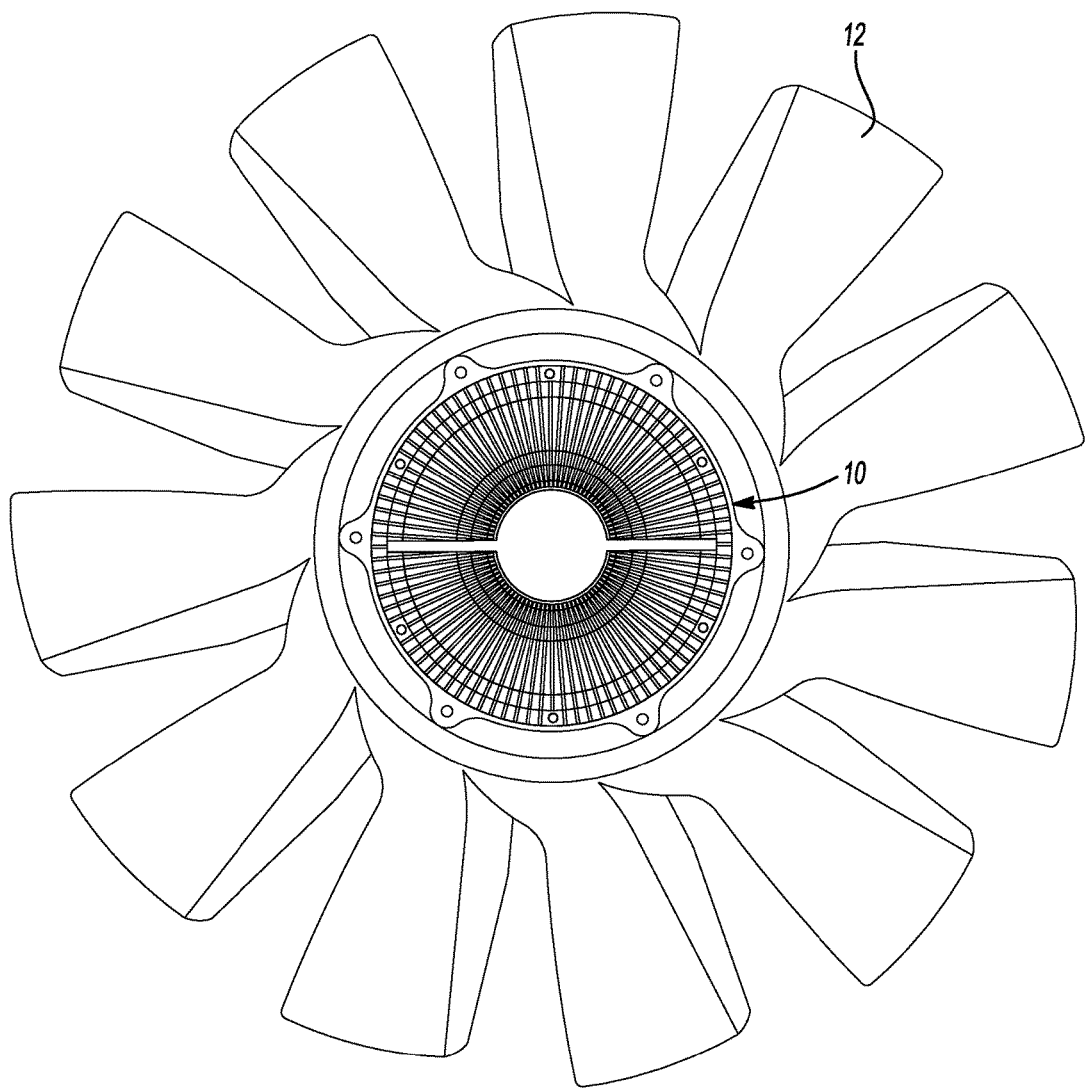
FIG. 1 is a front elevation view of an exemplary viscous fan clutch constructed in accordance with the teachings of the present disclosure, the viscous fan clutch being illustrated in operative association with an exemplary fan.

With reference to FIG. 1, an exemplary apparatus configured to employ shear forces to transmit rotary energy and constructed in accordance with the teachings of the present disclosure is generally indicated by reference numeral 10. In the particular example provided, the apparatus is a viscous fan clutch that is shown in operative association with a fan 12, but it will be appreciated that the teachings of the present disclosure have application to other devices, including without limitation clutches, heaters and pumps.

Figure 2:
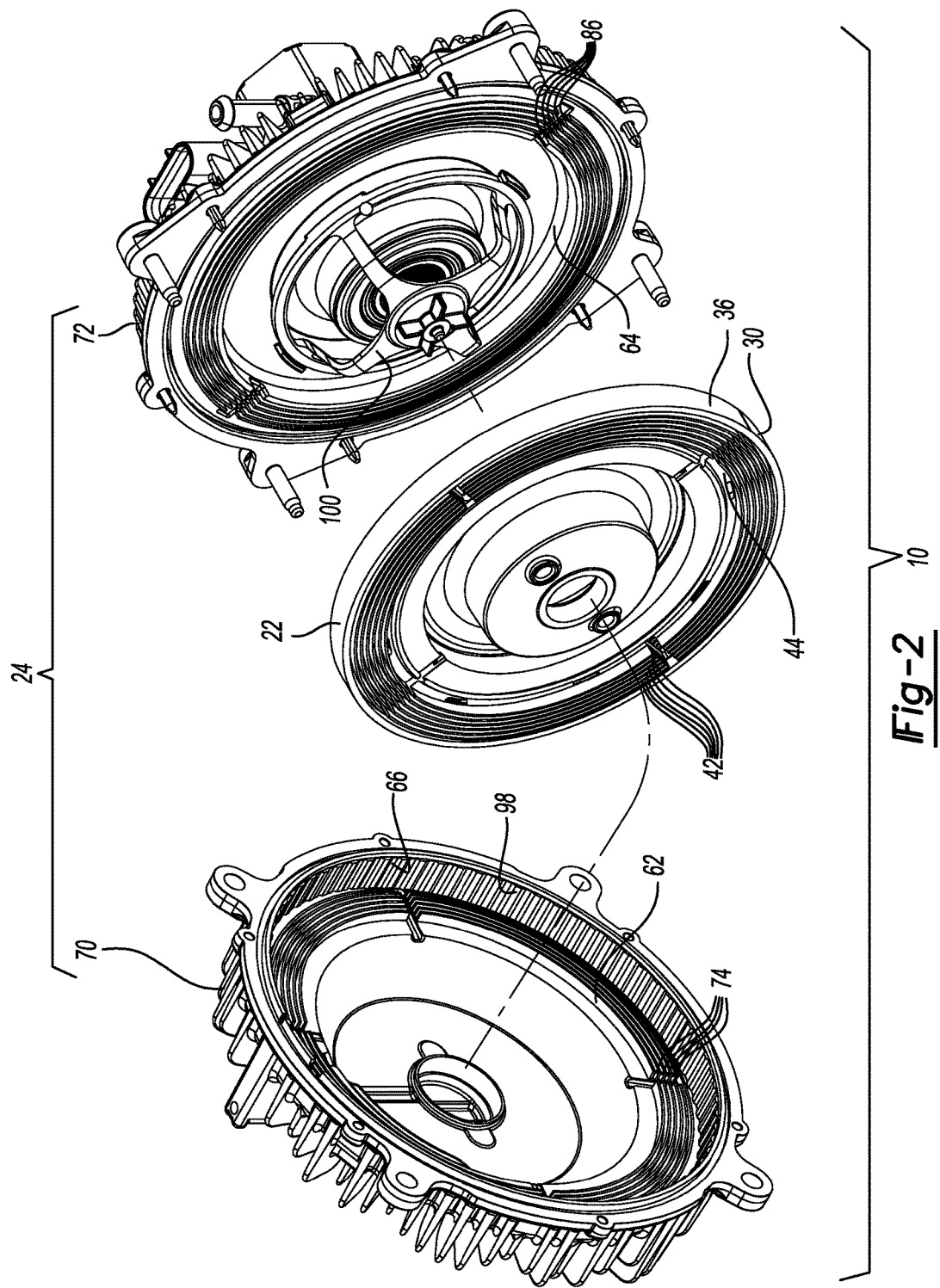
FIG. 2 is an exploded perspective view of the fan clutch of FIG. 1.
Figure 3:
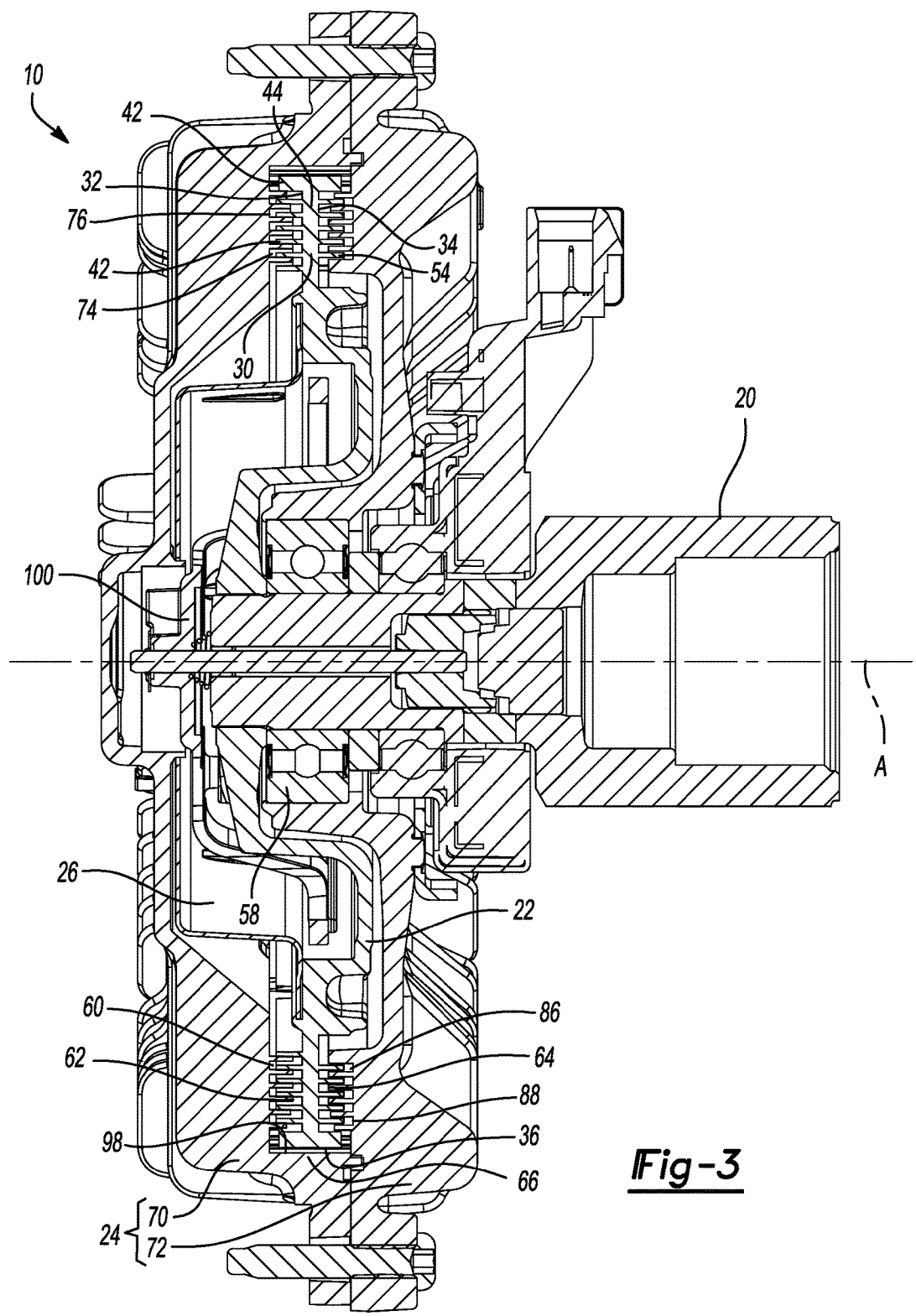
FIG. 3 is a longitudinal section view of the fan clutch of FIG. 1.

With reference to FIGS. 2 and 3, the apparatus 10 can comprise an input shaft 20, a disk 22, an outer housing assembly 24, and a reservoir 26. The input shaft 20 can serve as the input member of the apparatus 10 and can be directly driven by a source of rotary power (e.g., the input shaft 20 can be directly coupled to or unitarily formed with an output shaft of an electric motor) or can be coupled to a source of rotary power through an endless power transmission means. The endless power transmission means could comprise a belt (not shown), such as a V-belt or poly V-belt, that could be part of a conventional front engine accessory drive system (FEAD). The belt of the FEAD can be mounted on a plurality of pulleys (not shown), including a crankshaft pulley, which can be coupled to an engine crankshaft for rotation therewith, and an accessory pulley that can be mounted to the input shaft 20 for common rotation. Alternatively, the endless power transmission means could comprise a chain and sprockets, or could comprise a plurality of meshing gears.

Figure 4:
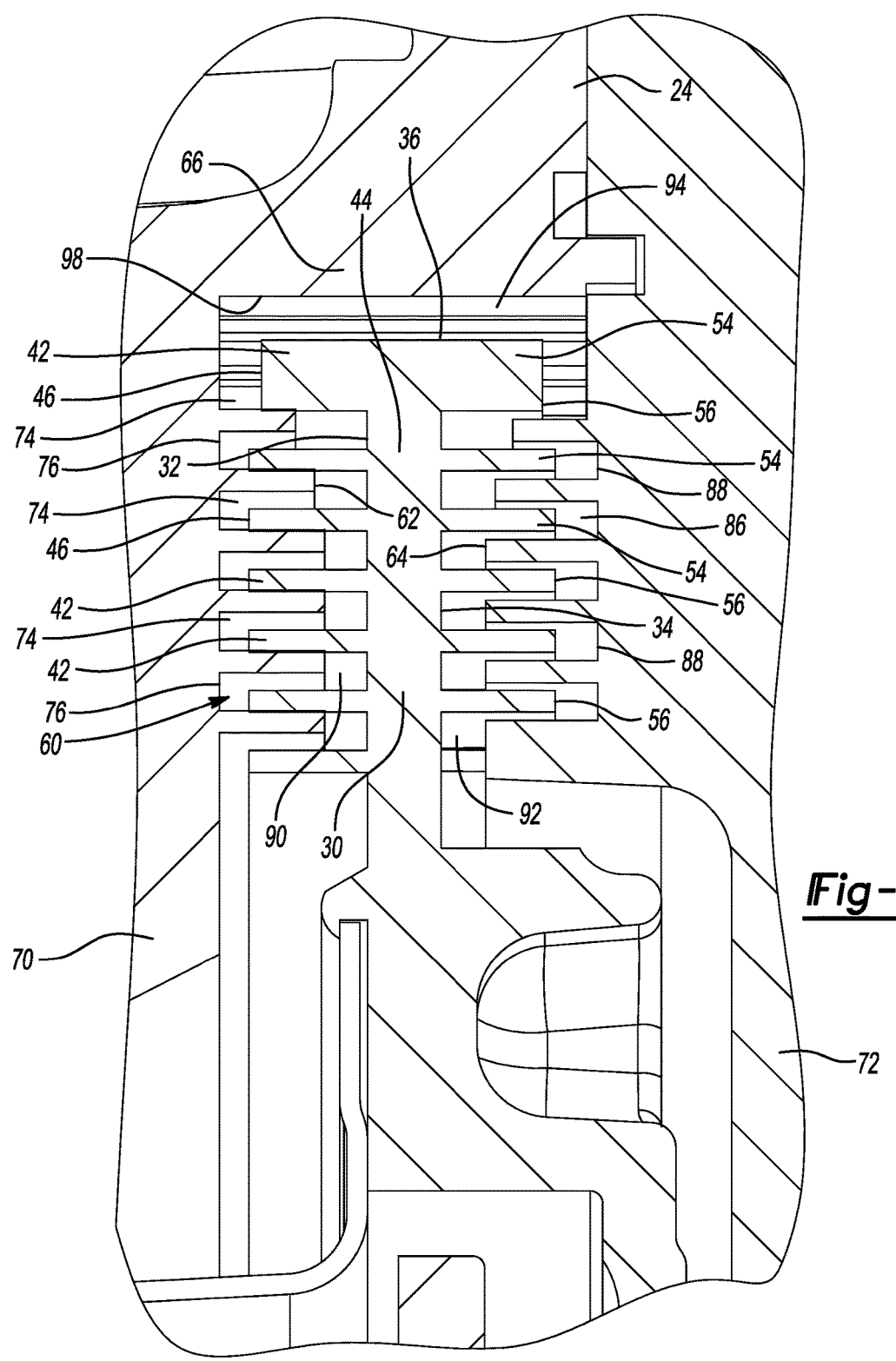
FIG. 4 is an enlarged portion of FIG. 3.

With reference to FIGS. 3 and 4, the disk 22 can be mounted to the input shaft 20 for rotation therewith. The disk 22 can comprise a rotor portion 30 that can have a first side 32, a second side 34 and an outer circumferential surface 36. The first side 32 can have a plurality of first concentric ribs 42 that are disposed concentrically about a rotational axis A of the input shaft 20. In the example provided, each of the first concentric ribs 42 extends from an axial side of a body 44 of the rotor portion 30 in a direction that is parallel to the rotational axis A and each of the first concentric ribs 42 terminates a first rib end face 46 that is perpendicular to the rotational axis A. Optionally, the second side 34 can have a plurality of second concentric ribs 54 that can be disposed concentrically about the rotational axis A. In the example provided, each of the second concentric ribs 54 extends from an opposite axial side of the body 44 of the rotor portion 30 in a direction that is parallel to the rotational axis A and each of the second concentric ribs 54 terminates a second rib end face 56 that is perpendicular to the rotational axis A. It will be appreciated that the configuration of the first concentric ribs 42 and/or the configuration of the second concentric ribs 54 (if included) could deviate from the particular configurations that are depicted herein.

The outer housing assembly 24 is the output member of the apparatus 10 in the example provided and is supported by one or more bearings 58 that are mounted on the input shaft 20 so as to be rotatable about the rotational axis A independently of the disk 22 and input shaft 20. The outer housing assembly 24 can define a working cavity 60 that can be bounded by a first annular wall 62, a second annular wall 64 and a circumferentially extending wall 66 that is disposed between and connects the first and second annular walls 62 and 64. In the example illustrated, the outer housing assembly 24 comprises a first housing member 70 and a second housing member 72 that cooperate to form the working cavity 60. The first annular wall 62 can define a plurality of first concentric fluid grooves 74 that can be disposed concentrically about the rotational axis A. In the example provided, each of the first concentric fluid grooves 74 extends into the first housing member 70 in a direction that is parallel to the rotational axis A, each of the first concentric fluid grooves 74 terminates a first root surface 76 that is perpendicular to the rotational axis A, and each of the first root surfaces 76 are disposed in a common plane. If the disk 22 includes the second concentric ribs 54, the second annular wall 64 can define a plurality of second concentric fluid grooves 86 that can be disposed concentrically about the rotational axis A. In the example provided, each of the second concentric fluid grooves 86 extends into the second housing member 72 in a direction that is parallel to the rotational axis A, each of the second concentric fluid grooves 86 terminates at a second root surface 88 that is perpendicular to the rotational axis A, and each of the second root surfaces 88 are disposed in a common plane. It will be appreciated that the configuration of the first concentric fluid grooves 74 and/or the configuration of the second concentric fluid grooves 86 (if included) could deviate from the particular configurations that are depicted herein.

The disk 22 can be received in the outer housing assembly 24 such that the rotor portion 30 is disposed in the working cavity 60. Each of the first concentric ribs 42 can be received in an associated one of the first concentric fluid grooves 74 and if the rotor portion 30 includes the second concentric ribs 54, each of the second concentric ribs 54 can be received in an associated one of the second concentric fluid grooves 86.

The reservoir 26 can be coupled in fluid communication with the working cavity 60 and can hold a suitable working fluid, such as a silicone fluid, therein. More specifically, a working fluid flow path can extend between the reservoir 26 and the working cavity 60 and can include a first gap 90, which is disposed axially between the first annular wall 62 and the first side 32 of the rotor portion 30, a second gap 92, which is disposed axially between the second annular wall 64 and the second side 34 of the rotor portion 30, and a third gap 94 that is disposed radially between a radially inner surface 98 of the circumferentially extending wall 66 and the outer circumferential surface 36 of the disk 22. The first, second and third gaps 90, 92 and 94 are typically very small (relative to the diameter of the disk 22), typically being less than 3 mm wide (i.e., the space between the disk 22 and the outer housing assembly 24 in any one of the first, second and third gaps 90, 92, and 94 is typically less than 3 mm in dimension).

Figure 5:
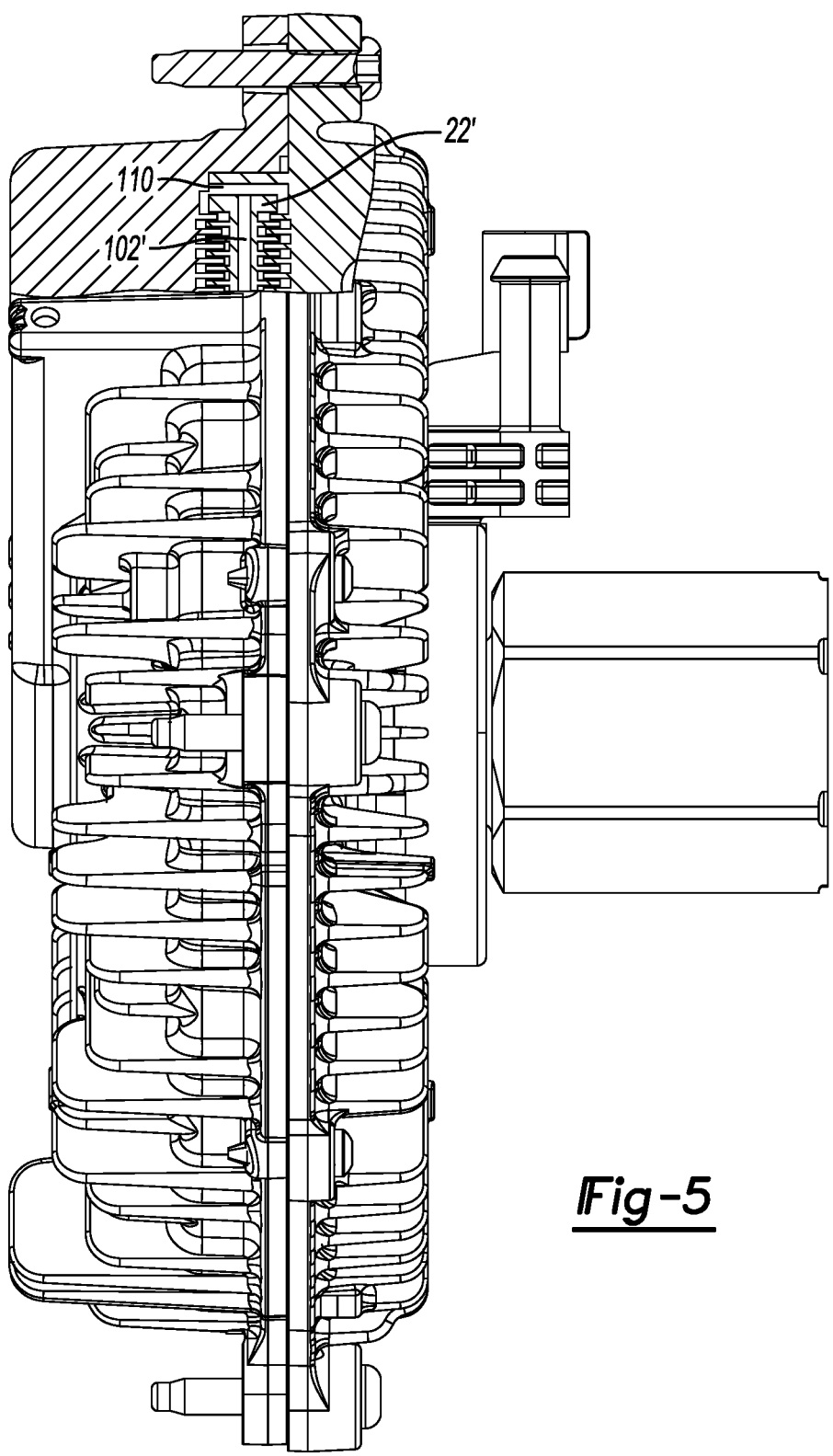
FIG. 5 is a perspective, partly sectioned view of another fan clutch constructed in accordance with the teachings of the present disclosure.

The reservoir 26 can be disposed in any desired location and need not be located within the outer housing assembly 24. In the example provided, the reservoir 26 is defined partly by the disk 22 and partly by the first housing member 70 of the outer housing assembly 24. If desired, a valve 100 can be employed to control fluid communication between the reservoir 26 and the working cavity 60. In the example provided, the valve 100 is coupled to the disk 22 for rotation therewith. The valve 100 can be operated in any desired manner, such as with a bimetallic element, an electromagnet, or a pneumatic cylinder, for example. Fluid exiting the working cavity 60 can be returned to the reservoir 26 via a return line 102. The return line 102 can be formed in the outer housing assembly 24, for example in the first housing member 70 as shown in FIG. 3. Alternatively, the return line 102' can be formed radially through the disk 22' as is shown in FIG. 5.

Figure 6:
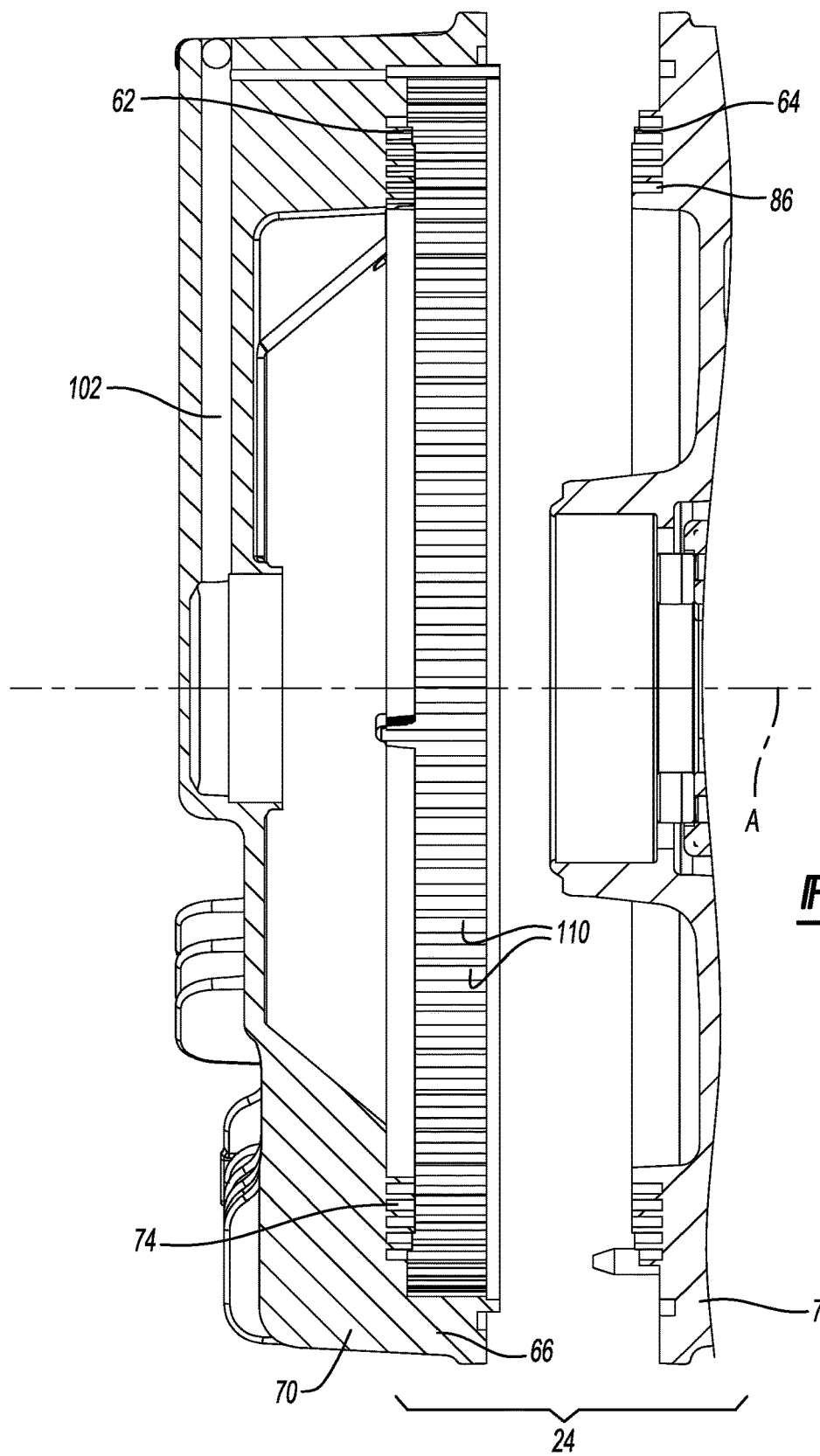
FIG. 6 is an exploded perspective view of a portion of the fan clutch of FIG. 1, illustrating portions of an outer housing assembly in more detail.

With reference to FIGS. 3, 4 and 6, the outer housing assembly 24 can comprise a plurality of flow altering structures 110 that are configured to locally reduce a thickness of a boundary layer of the working fluid adjacent the outer housing assembly 24 when the disk 22 is rotated relative to the outer housing assembly 24 and a portion of the working fluid is in the working fluid flow path. In the example provided, the flow altering structures 110 are disposed on the circumferentially extending wall 66, but it will be appreciated that the flow altering structures 110 could be disposed on the first annular wall 62 and/or the second annular wall 64 in addition to or in lieu of the circumferentially extending wall 66. Also in the example provided, the flow altering structures 110 number at least five (5) in quantity that are disposed on the circumferentially extending wall 66.

Figure 7:
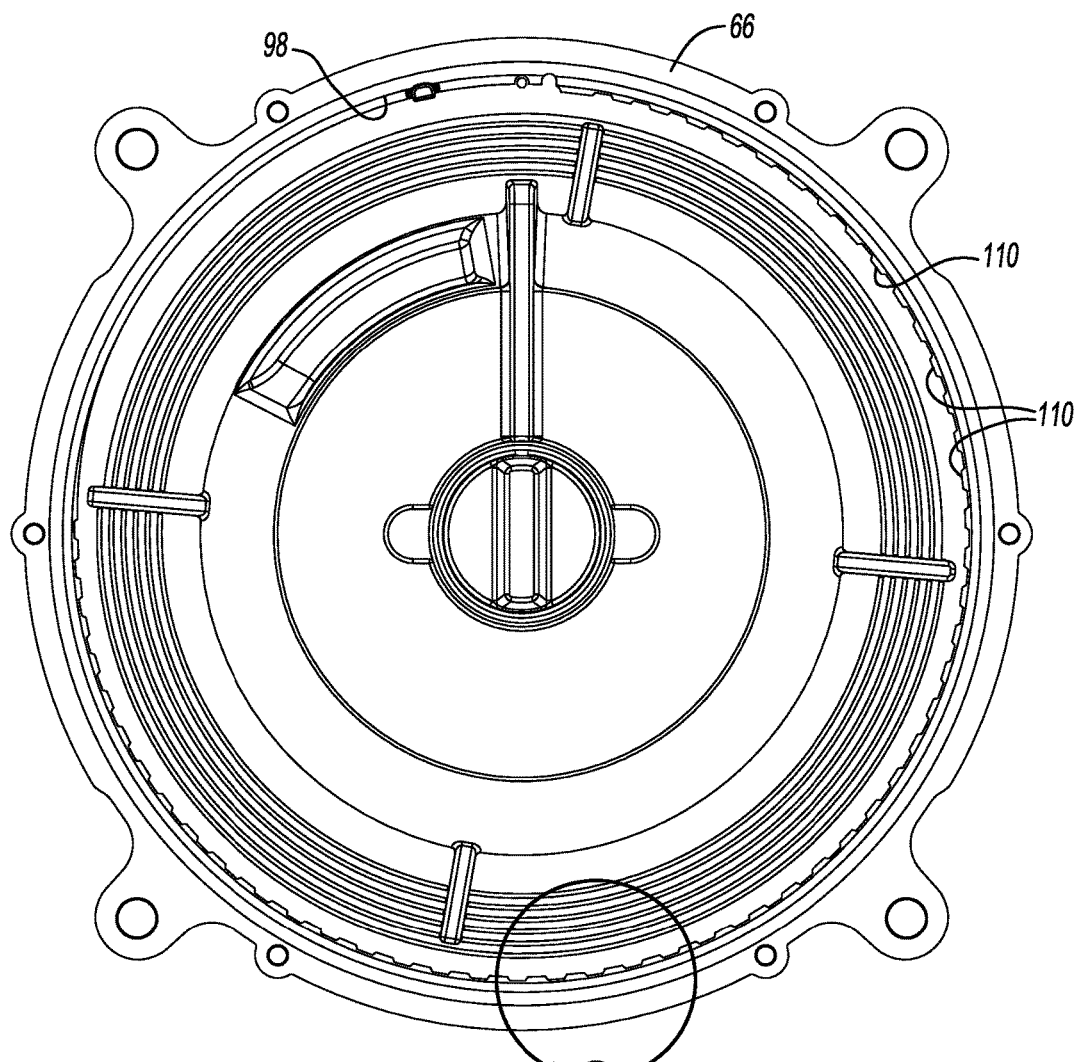
FIG. 7 is a rear elevation view of a portion of the fan clutch assembly, illustrating a portion of the outer housing assembly in more detail.
Figure 8:
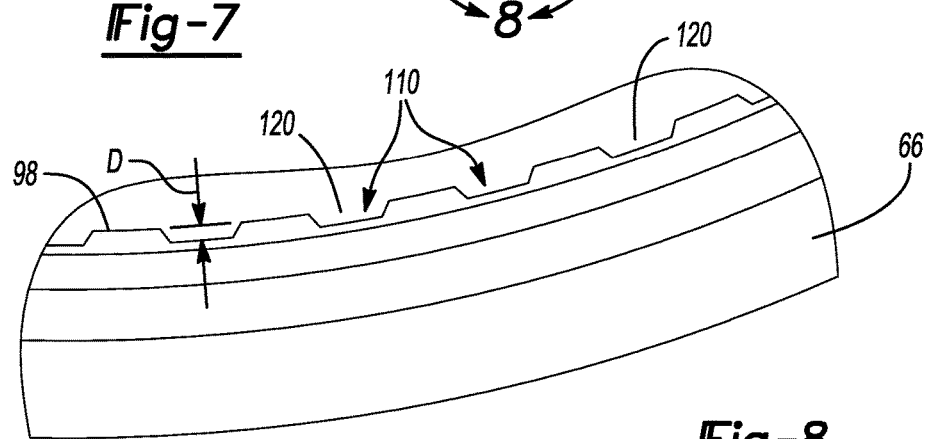
FIG. 8 is an enlarged portion of FIG. 7.
Figure 9:
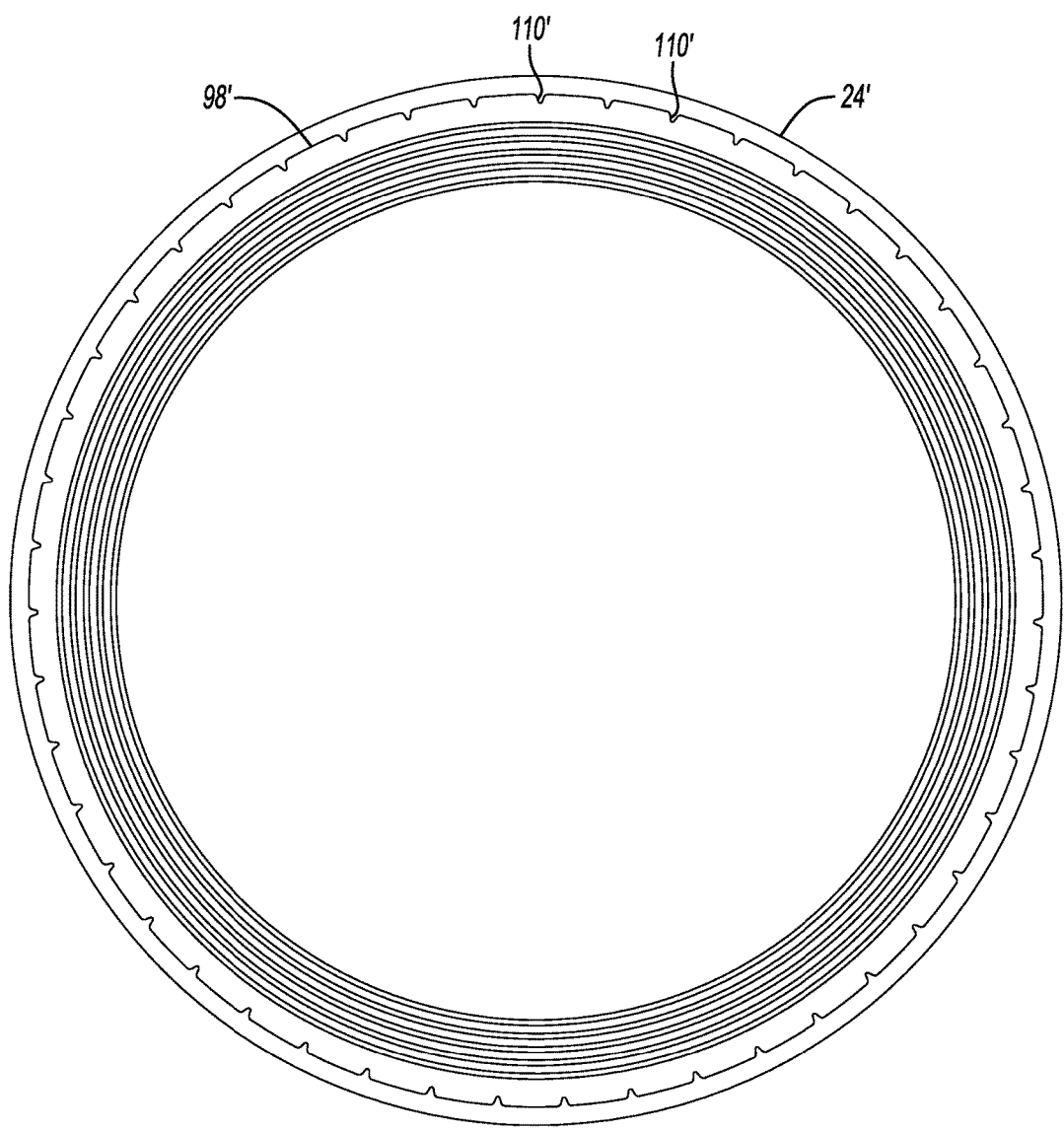
FIG. 9 is a view similar to that of FIG. 7 but illustrating an alternatively configured portion of the outer housing assembly.

With reference to FIG. 9, the flow altering structures 110' can be formed as projections that extend from an interior surface 98' of the outer housing assembly 24'. In the example of FIGS. 6 through 8, however, the flow altering structures 110 comprise cavities 120 that are formed in a radially inner surface 98 of the circumferentially extending wall 66. Each of the cavities 120 extends radially outwardly of the radially inner surface 98 of the circumferentially extending wall 66.

Figure 10:
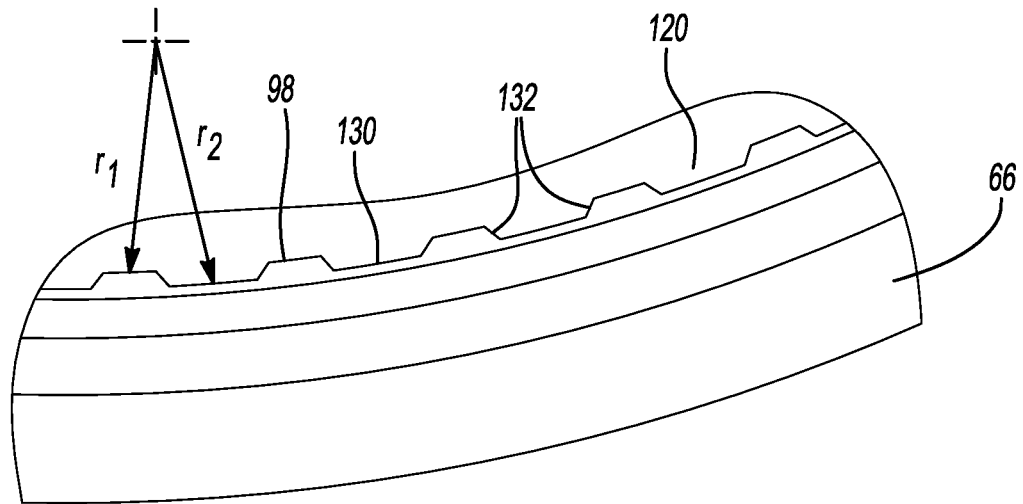
FIGS. 10 and 11 are views similar to that of FIG. 8 but illustrating alternatively configured portions of the outer housing assembly.
Figure 11:
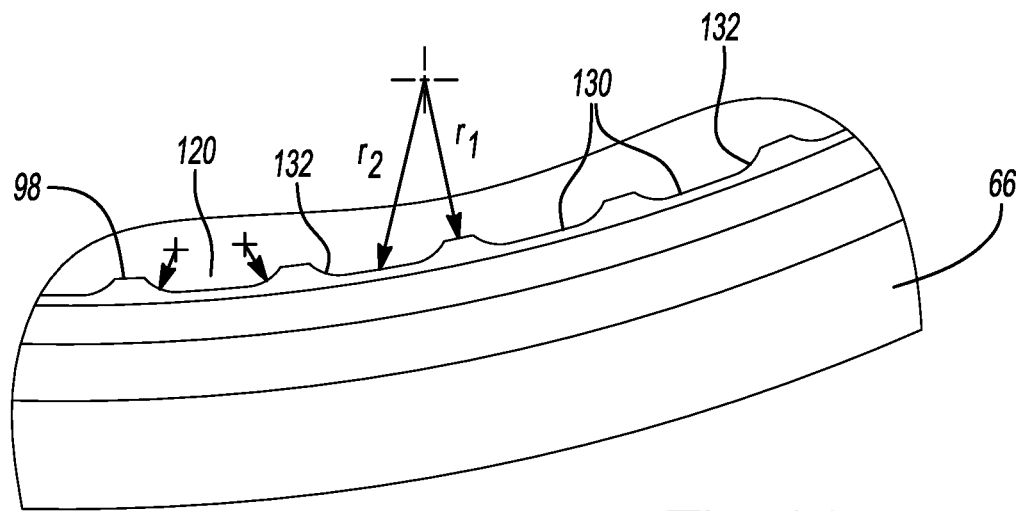

The configuration of the cavities 120 can be varied to suit several objectives, such the ease and manner with which the cavities 120 can be formed, the manner in which the working fluid is drawn into the cavities 120, and/or the manner in which the working fluid exits from the cavities 120. For example and with reference to FIG. 10, each cavity 120 can optionally have a radially outward wall 130 that is at least partially concentric with the radially inner surface 98 of the circumferentially extending wall 66. Each of the cavities 120 can have a pair of end segments 132 that are disposed on opposite sides of the radially outward wall 130. One or both of the end segments 132 can optionally taper, in whole or in part, between the radially outward wall 130 and the radially inner surface 98 of the circumferentially extending wall 66. As another example and with reference to FIG. 11, each of the end segments 132 can connect the radially outward wall 130 to the radially inner surface 98 of the circumferentially extending wall 66 and optionally one or both of the end segments 132 can be defined at least partly by a radius.

Returning to FIGS. 6 through 8, the depth D of the cavities 120 can be set to any desired depth. However, we have found it to be most practical if the cavities 120 have a radial depth D relative to the radially inner surface 98 of the circumferentially extending wall 66 that is greater than or equal to 0.2 mm and less than or equal to 3.5 mm. Preferably, the radial depth of the cavities 120 can be greater than or equal to 0.5 mm and less than or equal to 2.8 mm. More preferably, the radial depth of the cavities 120 can be greater than or equal to 0.8 mm and less than or equal to 2.5 mm.

In the particular example provided, the radially inner surface 98 of the circumferentially extending wall 66 can define a theoretical (right circular) cylinder about which the flow altering structures 110 are populated. The flow altering structures 110 can be populated about the surface of the theoretical cylinder in one or more contiguous zones and with one or more desired population densities. For purposes of this discussion: a) the width of any contiguous zone is defined by parallel planes that extend perpendicular to the rotational axis A, wherein each plane is tangent to at least one point on at least one of the flow altering structures 110 and all of the flow altering structures 110 within that contiguous zone are disposed axially between the two parallel planes; and b) any contiguous zone that extends over an area that is less than the entirety of the surface of the theoretical cylinder has (straight) ends that are formed by intersecting planes that include the rotational axis A and extend through the surface of the theoretical cylinder, which is coincident with the radially inner surface 98 of the circumferentially extending wall 66, wherein each of the intersecting planes is tangent to at least one point on at least one of the flow altering structures 110 and all of the flow altering structures 110 within that contiguous zone are disposed axially between the two intersecting planes.

For example, the flow altering structures 110 could be disposed in a single zone that extends the entire circumference of the theoretical cylinder (i.e., the flow altering structures 110 can be distributed over the entirety of the radially inner surface 98 of the circumferentially extending wall 66). Alternatively, the flow altering structures 110 could be populated about the surface of the theoretical cylinder in one or more contiguous zones and with one or more desired population densities such that one or more zones of the surface of the theoretical cylinder are not populated with any of the flow altering structures 110. In the example of FIG. 7, a zone of the surface of the theoretical cylinder is not populated with any of the flow altering structures 110 to ensure that the flow altering structures 110 do not interfere with the transmission of the working fluid into the return line 102 (FIG. 6). In this example, the flow altering structures 110 are disposed in a single contiguous zone over a sector of the circumferentially extending wall 66, and none of the flow altering structures 110 are disposed in a remaining sector of the circumferentially extending wall 66 that spans at least 70 degrees. In the particular example provided, the remaining sector of the circumferentially extending wall 66 that is unpopulated spans about 90 degrees. Configuration in this manner may be necessary or desirable in some situations, for example to guard against the formation of undesirable flow characteristics in the proximity of the return line 102 (FIG. 6) in a configuration of the apparatus 10 (FIG. 1) that employs a wiper element W (FIG. 12) to direct working fluid into the end of the return line 102 (FIG. 6) that intersects the working cavity 60 (FIG. 4).

Figure 12:
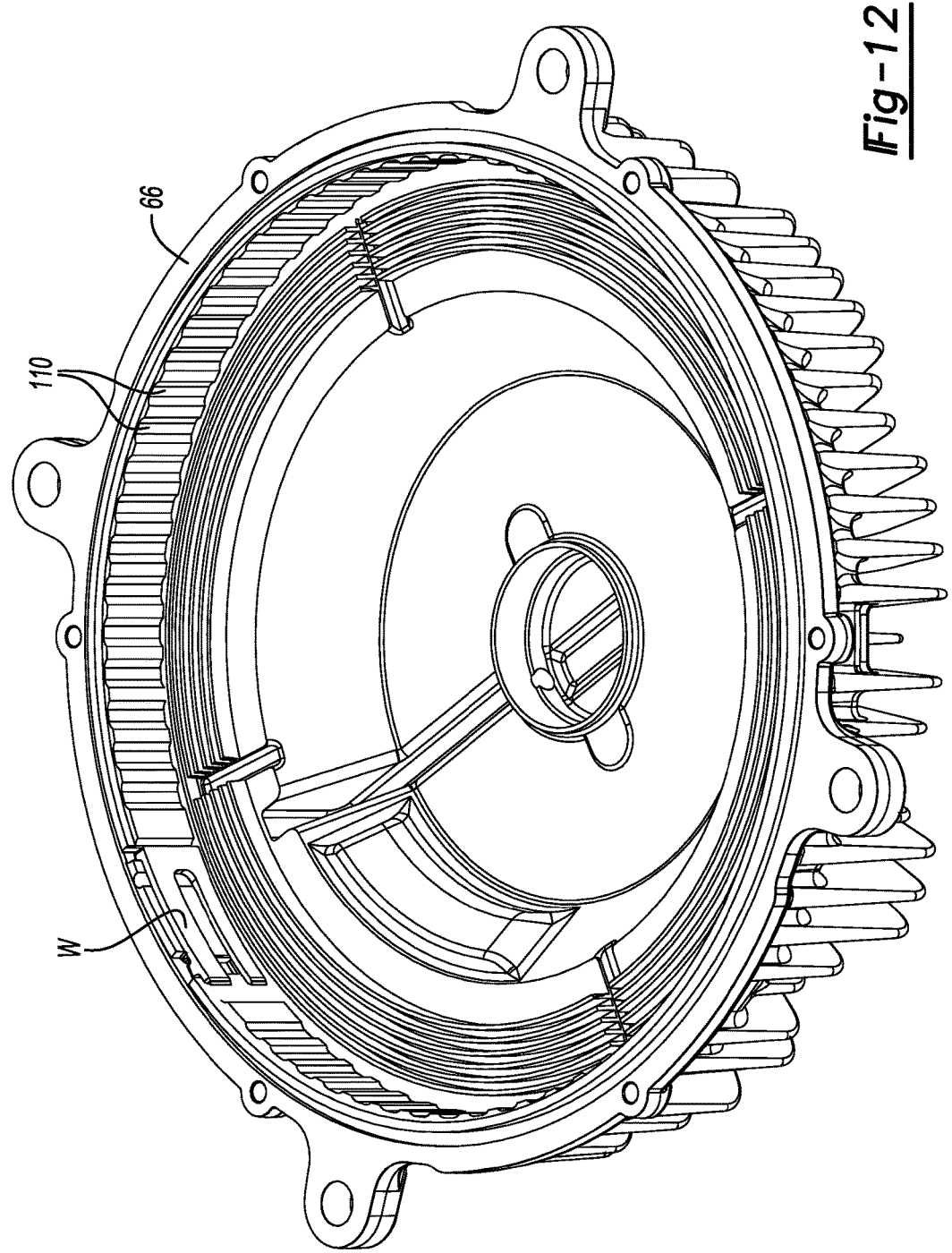
FIG. 12 is a perspective view illustrating a portion of another outer housing assembly constructed in accordance with the teachings of the present disclosure.

It will be appreciated, however, that the flow altering structures 110 could be disposed in a single contiguous zone over a sector that spans completely or nearly completely about the perimeter of the circumferentially extending wall 66, as is shown in FIG. 12. Moreover, a configuration of the apparatus 10 (FIG. 1) that does not employ a wiper element, such as the embodiment of FIG. 5, which employs a return line 102' that extends radially through the disk 22', may benefit from a configuration in which the flow altering structures 110 are disposed in a single contiguous zone that spans the entire circumference of the radially inner surface 98 of the circumferentially extending wall.

Returning to FIG. 7, because a sector of the circumferentially extending wall 66 is not populated with the flow altering structures 110, the flow altering structures 110 can be thought of as being spaced in an uneven manner about the circumference of the circumferentially extending wall 66. Alternatively, a variable or varied spacing between the flow altering structures 110 that are disposed within a contiguous zone could be employed to provide uneven spacing of the flow altering structures 110.

Within a contiguous zone that is populated by the flow altering structures 110, the flow altering structures 110 can be sized and populated on the radially inner surface 98 of the circumferentially extending wall 66 such that the flow altering structures 110 in the contiguous zone are disposed on at least 50% of the surface area of the surface of the theoretical cylinder that lies within the contiguous zone. More preferably, the flow altering structures 110 in a contiguous zone can be disposed on at least 75% of the surface area of the theoretical cylinder that lies within the contiguous zone.

With renewed reference to FIGS. 7 and 8, when the flow altering structures 110 are cavities 120 that are formed in the radially inner surface 98 of the circumferentially extending wall 66, each of the cavities 120 can have an aspect ratio (AR) that is defined by the following equation:

$$AR = C/R$$

where C is a maximum circumferential length of the cavity 120 measured at the radially inner surface 98 of the circumferentially extending wall 66; and R is a radial distance between a radially outer-most surface of the cavity 120 and the outer circumferential surface 36 (FIG. 4) of the rotor portion 30 (FIG. 4) taken along a line that intersects a rotational axis A of the disk 22 (FIG. 3). In some forms, the aspect ratio (AR) can be greater than or equal to 0.2 and less than or equal to 4.0. Preferably, the aspect ratio is greater than or equal to 0.25 and less than or equal to 2.75. More preferably, the aspect ratio is greater than or equal to 0.5 and less than or equal to 2.5. Still more preferably, the aspect ratio is greater than or equal to 1.0 and less than or equal to 1.5.

Figure 13:
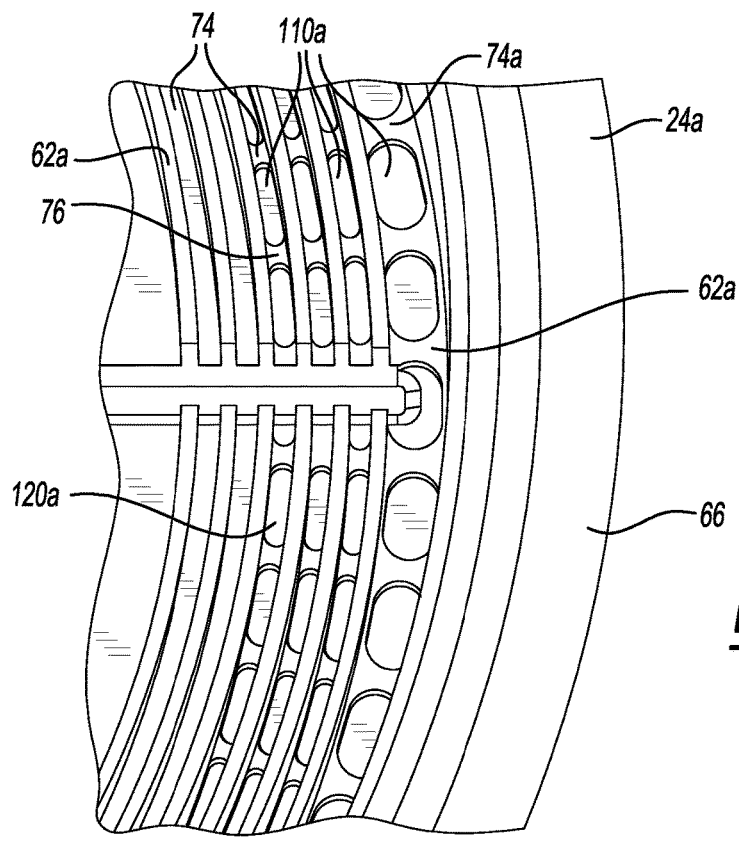
FIG. 13 is a perspective view illustrating a portion of another outer housing assembly constructed in accordance with the teachings of the present disclosure.
Figure 14:
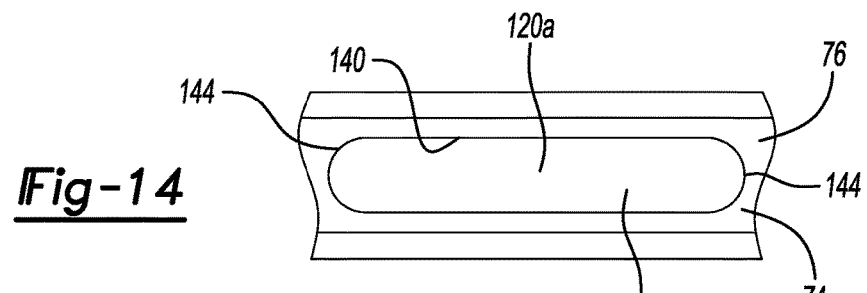
FIG. 14 is a rear elevation view of a portion of the outer housing assembly of FIG. 13.
Figure 15:
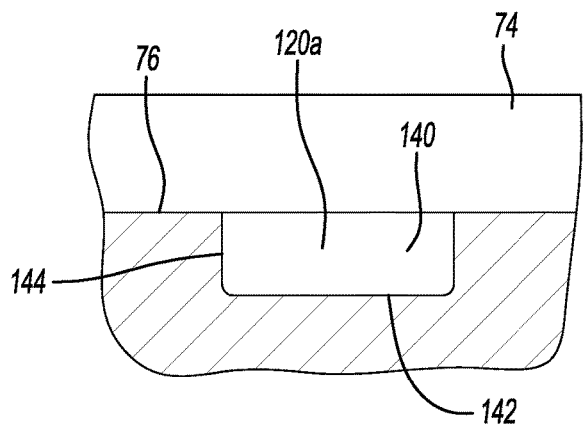
FIG. 15 is a section view taken through a portion of the outer housing assembly of FIG. 13.

In the example of FIGS. 13 through 15, the flow altering structures 110*a* are disposed on the first annular wall 62*a*. The flow altering structures 110*a* could comprise projections that extend axially from the first annular wall 62*a*, but in the particular example provided, the flow altering structures 110*a* comprise annular wall cavities 120*a* that are formed in the outer housing assembly 24*a* and which intersect at least one of the first root surfaces 76.

Each of the annular wall cavities 120*a* can have a depth relative to an associated one of the first root surfaces 76 that is greater than or equal to 0.2 mm and less than or equal to 3.5 mm. Preferably, the depth of the annular wall cavities 120*a* is greater than or equal to 0.5 mm and less than or equal to 2.8 mm. More preferably, the depth of the annular wall cavities 120*a* is greater than or equal to 0.8 mm and less than or equal to 2.5 mm.

Each of the annular wall cavities 120*a* can have a cavity sidewall 140 and a cavity bottom wall 142 that can be bounded by the cavity sidewall 140. If desired, at least a portion of the cavity sidewall 140 can be perpendicular to an associated one of the first root surfaces 76 at a location where the portion of the cavity sidewall 140 intersects the associated one of the first root surfaces 76. The annular wall cavities 120*a* can be configured such that at least a portion of the cavity bottom wall 142 is parallel to at least one of the first root surfaces 76. Each of the annular wall cavities 120*a* can further have a pair of opposite circumferential ends 144. At least one of the circumferential ends 144 can be at least partly defined by a radius at a location where the circumferential end 144 intersects an associated one of the first root surfaces 76.

Each of the annular wall cavities 120*a* has an aspect ratio (AR) that is defined by the equation:

$$AR = C/R$$

where: C is a maximum circumferential length of the annular wall cavity 120*a* measured at an associated one of the first root surfaces 76; and R is a maximum distance between the bottom wall 142 and a first rib end face 46 (FIG. 4) of an associated one of the first concentric ribs 42 (FIG. 4) taken parallel to the rotational axis A (FIG. 3) about which the disk 22 (FIG. 3) rotates relative to the outer housing assembly 24*a*. In some examples, the aspect ratio (AR) can be greater than or equal to 0.2 and less than or equal to 4.0. Preferably, the aspect ratio is greater than or equal to 0.25 and less than or equal to 2.75. More preferably, the aspect ratio is greater than or equal to 0.5 and less than or equal to 2.5. Still more preferably, the aspect ratio is greater than or equal to 1.0 and less than or equal to 1.5.

The flow altering structures 110*a* on the first annular wall 62*a* can be disposed within one or more zones, with each of the zones being coincident with an associated one of the first root surfaces 76 and having a planar annular shape or an annular segment shape. The flow altering structures 110*a* within each zone can be sized and populated in the one or more zones such that the flow altering structures 110*a* in the one or more zones can be disposed over at least 50% of the surface area of the one or more zones. Preferably, the flow altering structures 110*a* are sized and populated within the one or more zones such that the flow altering structures 110*a* in the one or more zones are disposed on at least 75% of the surface area of the one or more zones. For purposes of this discussion, if a zone on the first annular wall 62*a* does not extend completely around the first annular wall 62*a*, the zone can be bounded by a pair of planes that intersect one another, each of the planes can be tangent to one or more of the flow altering structures 110*a* at one or more points, and all of the flow altering structures 110*a* within that zone are disposed between the pair of intersecting planes.

The flow altering structures 110*a* can be disposed on the first annular wall 62*a* in any desired manner. For example, at least a portion of the flow altering structures 110*a* can be disposed about the first annular wall 62*a* such that they are not evenly spaced about the circumference of the first annular wall 62*a*. In this regard, a varied or variable spacing between the flow altering structures 110*a* can be employed, and/or the zone or zones of the flow altering structures 110*a* can be configured such that they do not extend fully about the circumference of the first annular wall 62*a*. In the particular example provided, the flow altering structures 110*a* are disposed in a single contiguous zone over a sector of the first annular wall 62*a*, and wherein none of the flow altering structures 110 are disposed in a remaining sector of the first annular wall 62*a* that spans at least 70 degrees. In the particular example provided, the remaining sector of the first annular wall 62*a* that is unpopulated spans about 90 degrees.

In the field of viscous fan clutches, it is relatively common for a radially outer-most one 74*a* of the first concentric fluid grooves 74 to be somewhat wider than the first concentric fluid grooves 74 that are radially inward of the radially outer-most one 74*a* of the first concentric fluid grooves 74. Consequently, it may be easier to manufacture the outer housing assembly 24*a* if the flow altering structures 110*a* in the first annular wall 62*a* were to be disposed only within the radially outer-most one 74*a* of the first concentric fluid grooves 74. It will be appreciated, however, that the teachings of the present disclosure also extend to the use of flow altering structures 110*a* in situations where they are confined solely to one or more of the first concentric fluid grooves 74 that are radially inward of the radially outer-most one 74*a* of the first concentric fluid grooves 74, as well as to situations where they are disposed on the radially outer-most one 74*a* of the first concentric fluid grooves 74 and one or more of the first concentric fluid grooves 74 that are radially inward thereof.

Those of skill in the art will appreciate that flow altering structures 110*a* could be disposed on the second annular wall 64 (FIG. 3) in a manner that is similar to that described above for the first annular wall 62*a* and that the use of flow altering structures 110*a* on the second annular wall 64 could be in addition to or in lieu of the flow altering structures 110*a* that are disposed on the first annular wall 62*a*.

Figure 16:
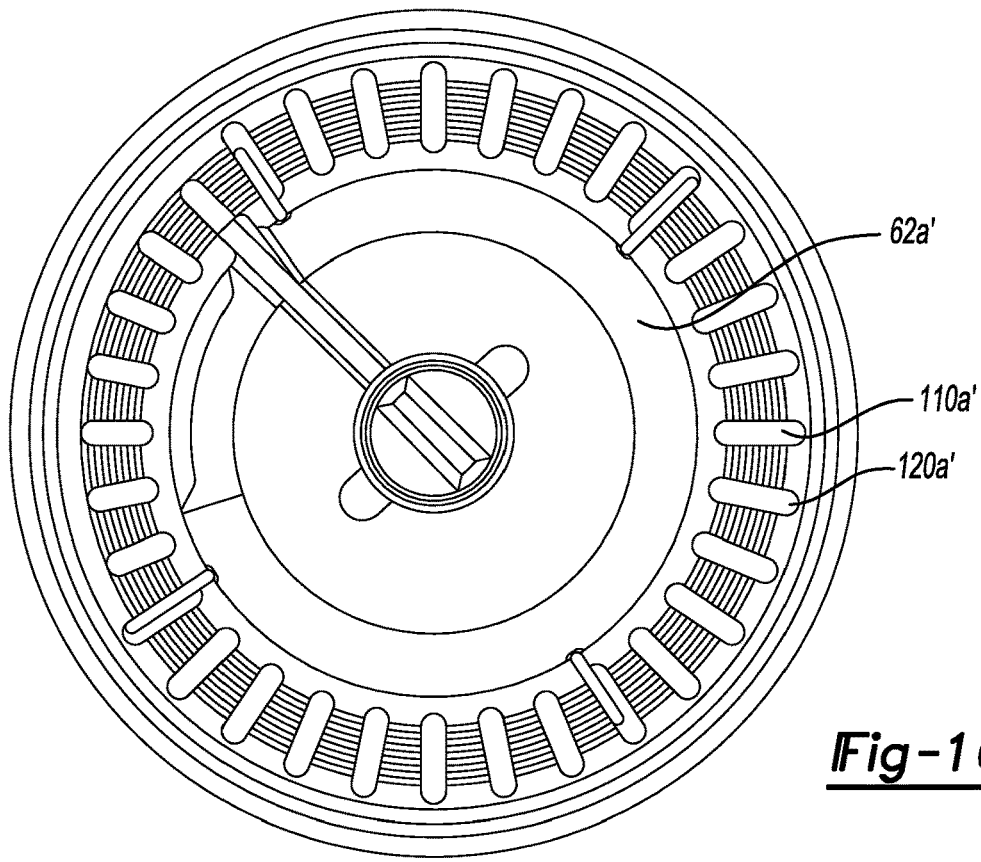
FIG. 16 is a rear elevation view of a portion of another outer housing assembly constructed in accordance with the teachings of the present disclosure.

While the flow altering structures 110*a* have been described as being circumferentially extending cavities 120*a* that are disposed in or on the first concentric fluid grooves 74, those of skill in the art will appreciate that the flow altering structures 110*a* could be formed somewhat differently. For example, the flow altering structures 110*a*' could be formed on the first annular surface 62*a*' so as to extend in a radial direction as shown in FIG. 16. In this example, the flow altering structures 110a' are cavities 120a' that intersect a plurality of the first concentric fluid grooves 74.

Figure 18:
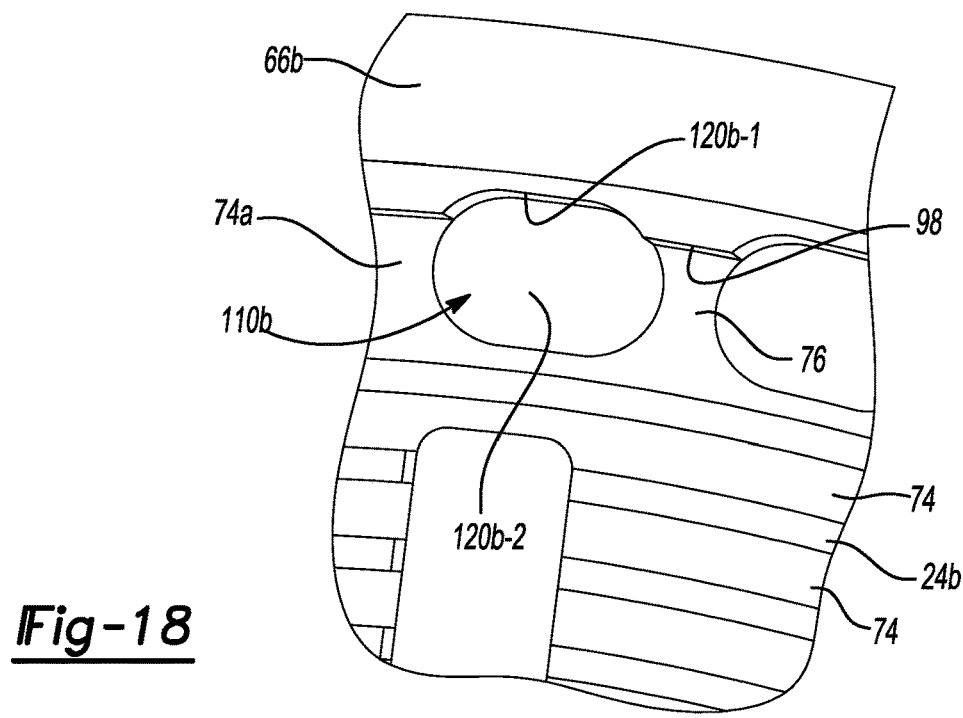
FIG. 18 is an enlarged view of a portion of the outer housing assembly of FIG. 17.
Figure 17:
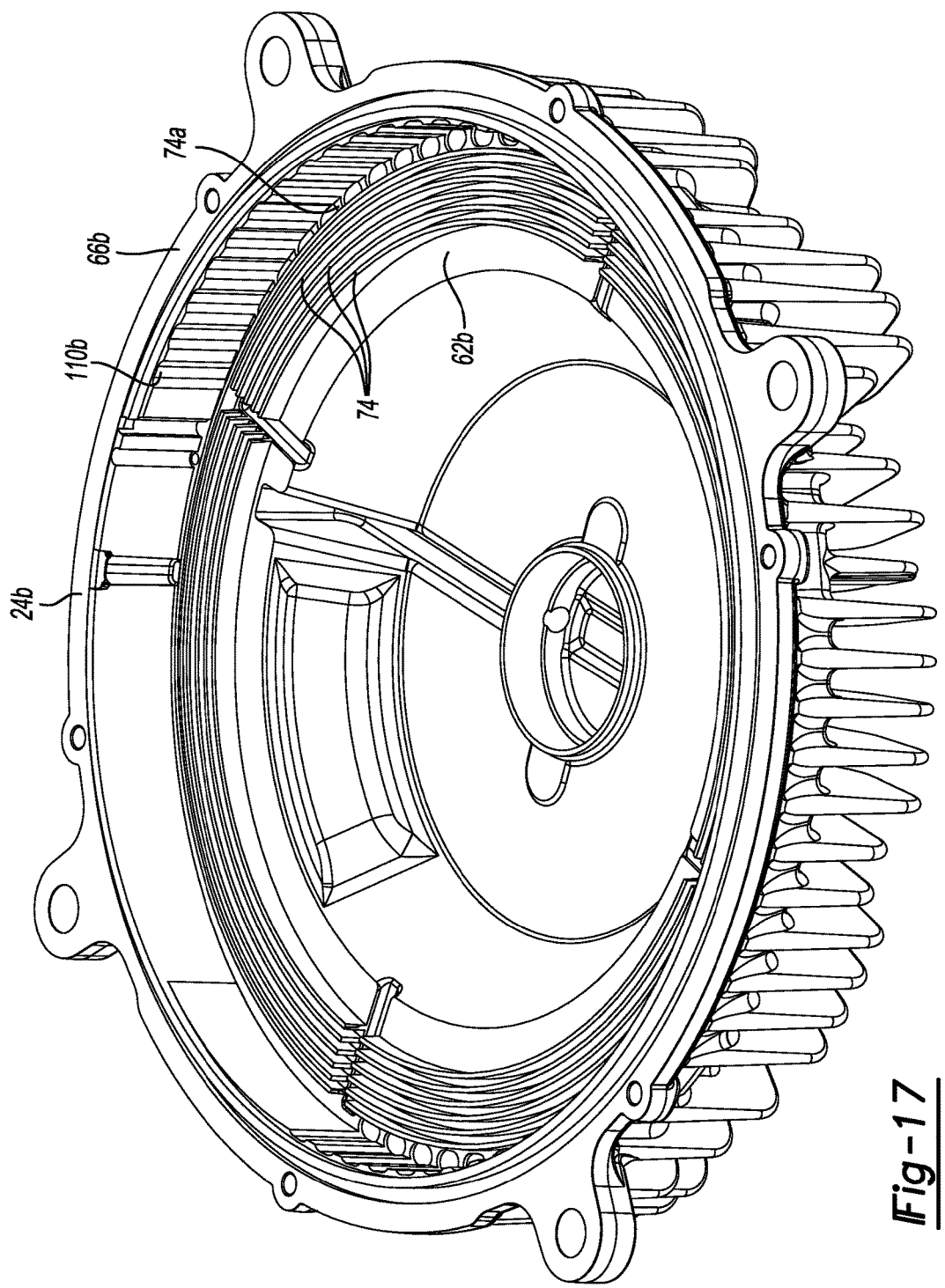
FIG. 17 is a perspective view of a portion of another outer housing assembly constructed in accordance with the teachings of the present disclosure.

With reference to FIGS. 17 and 18, a portion of another outer housing assembly 24b constructed in accordance with the teachings of the present disclosure is shown. The outer housing assembly 24b can be similar to any of the outer housing assemblies described above, except that the flow altering structures 110b are formed on both the circumferentially extending wall 66b and the radially outer-most one 74a of the first concentric fluid grooves 74 in the first annular wall 62b. In this example, each of the flow altering structures 110b comprises a first portion, which consists of a cavity 120b-1 formed in the radially inner surface 98 of the circumferentially extending wall 66b, and a second portion that consists of an annular wall cavity 120b-2 that is formed in the first root surface 76 of the radially outer-most one 74a of the first concentric fluid grooves 74 in the first annular wall 62b. The flow altering structures 110b in the particular example provided were formed via an end mill (not shown), but those of skill in the art will appreciate that the flow altering structures 110b could be formed in any appropriate manner, including casting (e.g., die casting, investment casting, sand casting). It will be appreciated that the sizing, population density, etc. of the flow altering structures 110b can be similar or identical to those described above for the first two embodiments.

With reference to FIG. 19, an apparatus 10b having an outer housing assembly 24b constructed in the manner of FIG. 17 is illustrated in operation wherein rotary power is provided to the input shaft 20 to drive the disk 22 and the valve 100 is operated in an open condition that permits fluid communication from the reservoir 26 through the working fluid flow path to the working cavity 60. During operation, fluid traveling through the working fluid flow path migrates between the first and second gaps 90 and 92 and rotation of the disk 22 relative to the outer housing assembly 24b creates a shear force in the working fluid in the first and second gaps 90 and 92. This shear force generates a torque that is applied against the outer housing assembly 24b and causes the outer housing assembly 24b to rotate about the rotational axis A. The shear forces also generate heat in the working fluid. The working fluid in the first and second gaps 90 and 92 progressively works its way in a radially outward direction until it is received in the third gap 94. The working fluid in the third gap 94 is eventually directed to an inlet of the return line 102, and is returned to the reservoir 26. Due to the relatively high viscosity of the working fluid and the relatively small size of the first, second and third gaps 90, 92 and 94, a Reynolds number of the working fluid in the portion of the working fluid flow path that extends through the working cavity 60 is less than 100, which is significantly below a transition from laminar to turbulent flow, which we understand as taking place at a Reynolds number of about 2000. For reference, we further understand that full turbulent flow would occur at a Reynolds number of about 4000.

Figure 20:
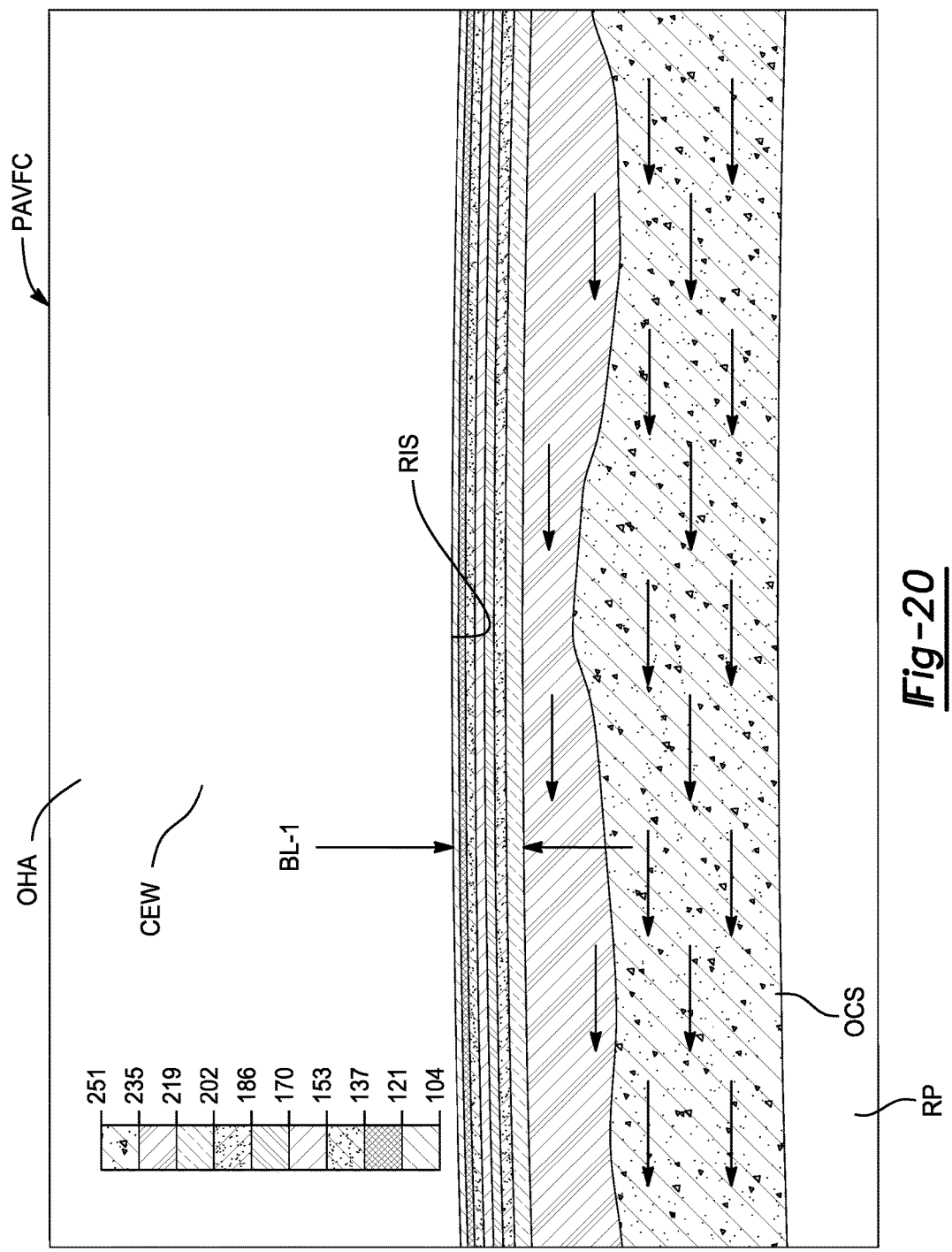
FIG. 20 is a schematic illustration of a portion of a prior art viscous fan clutch depicting a working fluid in a gap between a disk and an outer housing assembly, the working fluid forming a relatively thick boundary layer adjacent the prior art outer housing assembly.

With reference to FIG. 20, a greatly enlarged portion of the working fluid in the working fluid flow path of a conventionally configured (i.e., prior art) viscous fan clutch PAVFC is shown (created with the aid of CFD software). For purposes of this discussion, the prior art viscous fan clutch PAVFC is identical to the apparatus 10b of FIG. 19, except that the prior art viscous fan clutch PAVFC does not employ or include any of the flow altering structures described above. As is shown, a relatively thick and insulating boundary layer BL-1 of the working fluid between the radially inner surface RIS of the circumferentially extending wall CEW of the prior art outer housing assembly OHA and outer circumferential surface OCS of the prior art rotor portion RP stacks up against the radially inner surface RIS of the prior art outer housing assembly OHA. The relatively thick dimension of the boundary layer BL-1 limits heat transfer between the working fluid and the radially inner surface RIS of the prior art outer housing assembly OHA. In this example, the working fluid adjacent the outer circumferential surface OCS of the prior art rotor portion RP has a temperature of 251° C., the working fluid at the indicated point proximate the beginning of the boundary layer BL-1 has a temperature of 219° C., and the working fluid adjacent the radially inner surface RIS of the prior art outer housing assembly OHA has a temperature of 104° C.

With reference to FIG. 21, a greatly enlarged portion of the working fluid in the working fluid flow path of the apparatus 10b of FIG. 19 is shown under input and output conditions that are identical to those employed to generate the data employed in FIG. 20. As is readily apparent, the boundary layer BL-2 of the working fluid that is adjacent the radially inner surface 98 of the circumferentially extending wall 66b in areas local to the flow altering structures 110b is significantly smaller in thickness, which greatly improves the rate with which heat can be rejected from the working fluid to the rotating outer housing assembly 24b. In this example, the working fluid adjacent the outer circumferential surface 36 of the rotor portion 30 has a temperature of 164° C., the working fluid at the indicated point proximate the beginning of the boundary layer BL-2 has a temperature of 151° C., and the working fluid adjacent the radially inner surface 98 of the outer housing assembly 24b has a temperature of 107° C. As compared to the prior art viscous fan clutch PAVFC of FIG. 20, the temperature differential of the working fluid that spans between the outer circumferential surface 36 of the rotor portion 30 and the radially inner face 98 of the circumferentially extending wall 66b (in areas local to the flow altering structures 110b) is 44° C., a reduction of 71° C. from the differential (i.e., 115° C.) that was obtained by the prior art viscous fan clutch PAVFC (FIG. 20). Moreover, because of the increased rate of heat rejection (from the working fluid to the outer housing assembly 24b), the maximum temperature of the working fluid was reduced by 87° C. in the apparatus 10b as compared to the prior art viscous fan clutch PAVFC (FIG. 20).

Plots in FIG. 22 depict isothermal combinations of input and output speed for a pair of viscous fan clutches (i.e., a first or prior art viscous fan clutch and a second viscous fan clutch that was constructed in accordance with the teachings of the present disclosure and which had flow altering structures) that limit the temperature of a working fluid in these clutches to a predetermined maximum temperature. In the particular example provided, the predetermined maximum temperature is 232° C. and as such, each of the plots (200, 202) represents an operational speed boundary (expressed in terms of slip heat horsepower) for a respective one of the clutches beyond which a silicone working fluid will rapidly degrade, causing failure of the clutch. The two plots consist of a baseline plot 202, which depicts maximum slip heat horsepower that the prior art viscous fan clutch of FIG. 20 can withstand prior to the working fluid therein reaching the maximum critical temperature (i.e., the operational boundary of the prior art viscous fan clutch) and another plot 200 that depicts maximum slip heat horsepower that the viscous fan clutch of FIG. 19 can withstand before the working fluid reaches the maximum critical temperature (i.e., the operational boundary of the viscous fan clutch of FIG. 19). Each of the plots depicts maximum slip heat horsepower of a respective one of the viscous fan clutches as a function of the input speed of the viscous fan clutch and the fan or output speed of the fan clutch. The data was generated per test CS-47438.0 with a fan manufactured by BorgWarner Inc. under part number 010023275 (Ø25 inch×9×2.52 inch) and a ø26 inch (660.4 mm diameter) ring shroud in conjunction with a prior art model 664 viscous fan clutch produced by BorgWarner under part number 010026784, which was employed to generate the baseline plot 202, or in conjunction with a model 664 viscous fan clutch produced by BorgWarner under part number 010026784 and modified as described in the example of FIG. 19. A line (i.e., the 50% line 210) depicts a situation in which the fan or output speed of the viscous fan clutch is one-half (i.e., 50%) of that of the input speed of the viscous fan clutch. As is apparent from the two plots 202 and 200, the maximum slip heat horsepower of the prior art viscous fan clutch PAVFC (FIG. 20) is 3.4 HP where the baseline plot 202 intersects the 50% line 210, whereas the maximum slip heat horsepower of the viscous fan clutch 10b (FIG. 19) constructed in accordance with the teachings of the present disclosure is 4.0 HP where the plot 200 intersects the 50% line 210. The 0.6 HP increase in maximum slip heat horsepower is a 17% improvement that is a directly attributable to the improved heat rejection capabilities that are provided by the teachings of the present disclosure.

In view of the above discussion, a method is provided that includes: providing an apparatus having an outer housing assembly, a disk and a reservoir, the outer housing assembly having a working cavity, the disk being rotatable in the outer housing assembly, the disk having a rotor portion that is rotatably received in the working cavity, the working cavity being in fluid communication with the reservoir; rotating the rotor within the outer housing assembly to generate a flow of a working fluid through the working cavity and to apply a shear force to the working fluid flowing through working cavity; and at a plurality of discrete locations on the outer housing assembly where the flow of the working fluid passes through the working cavity, inducing movement of the working fluid in a direction that is transverse to a boundary layer of the working fluid that is adjacent to the first annular surface. The locations on the outer housing assembly can be where the flow of the working fluid through the working cavity has a Reynolds number that is less than 100.

The first surface can be formed on an annular wall of the outer housing assembly. Additionally or alternatively, the first surface can be formed on a circumferentially extending wall of the outer housing assembly. As such, the method can further include inducing disturbances in a laminar flow of the working fluid in a second area that is adjacent to a second surface of the working cavity as the working fluid passes through the working cavity during operation of the apparatus.

The method can further include forming a plurality of flow altering structures on the outer housing assembly. The flow altering structures can be unitarily formed with a portion of the outer housing assembly that defines a plurality of concentric fluid grooves, and the flow altering structures can optionally be formed as cavities. If the flow altering structures are formed as cavities, the method can further include casting at least a portion of the outer housing assembly, wherein at least a portion of the cavities are formed on the portion of the outer housing assembly when the portion of the outer housing assembly is cast. Additionally or alternatively, the method could further include removing material from a portion of the outer housing assembly to form at least a portion of the cavities. Material can be removed from the portion of the outer housing assembly in an operation selected from a group consisting of: milling, drilling, etching, broaching, and electro-discharge machining.

Additionally or alternatively, the method could further include forming a portion of the outer housing assembly in an operation selected from a group consisting of: stamping, embossing, forging, fine blanking and knurling to form one or more flow altering structures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus comprising:
   an outer housing assembly having a working cavity that is bounded by a first annular wall, a second annular wall and a circumferentially extending wall that is disposed between and connects the first and second annular walls, the first annular wall having a plurality of first concentric fluid grooves;
   a disk that is rotatably received in the outer housing assembly, the disk having a rotor portion that is received in the working cavity, the rotor portion having a first side, a second side and an outer circumferential surface, the first side having a plurality of first concentric ribs, each of the first concentric ribs being received in an associated one of the plurality of first concentric fluid grooves; and
   a reservoir that is adapted to hold a working fluid therein, the reservoir being coupled in fluid communication with the working cavity via a working fluid flow path, the working fluid flow path having a first gap, which is disposed axially between the first annular wall of the outer housing assembly and the first side of the rotor portion, a second gap, which is disposed axially between the second annular wall of the outer housing assembly and the second side of the rotor portion, and a third gap, which is disposed radially between the circumferentially extending wall of the outer housing assembly and the outer circumferential surface of the rotor portion;
   wherein at least one of the first annular wall and the circumferentially extending wall comprises a plurality of flow altering structures that are configured to promote disturbances in a laminar flow of the working fluid in an associated one or ones of the first and third gaps in areas local to the flow altering structures when the disk is rotated relative to the outer housing assembly and a portion of the working fluid is in the working fluid flow path.

2. The apparatus of claim 1, wherein the flow altering structures comprise cavities formed in a radially inner surface of the circumferentially extending wall, each of the cavities extending radially outwardly of the radially inner surface of the circumferentially extending wall.

3. The apparatus of claim 2, wherein each cavity has a radially outward wall that is at least partly concentric with the radially inner surface of the circumferentially extending wall.

4. The apparatus of claim 2, wherein each of the cavities has a pair of end segments that are disposed on opposite sides of a radially outward wall, wherein at least a portion of one of the end segments tapers between the radially outward wall and the radially inner surface of the circumferentially extending wall.

5. The apparatus of claim 2, wherein each of the cavities has a pair of end segments that are disposed on opposite sides on a radially outward wall, each of the end segments connecting the radially outward wall to the radially inner surface of the circumferentially extending wall and at least one of the end segments being defined at least partly by a radius.

6. The apparatus of claim 2, wherein each of the cavities has a radial depth relative to the radially inner surface of the circumferentially extending wall that is greater than or equal to 0.2 mm and less than or equal to 3.5 mm.

7. The apparatus of claim 6, wherein the radial depth of the cavities is greater than or equal to 0.5 mm and less than or equal to 2.8 mm.

8. The apparatus of claim 7, wherein the radial depth of the cavities is greater than or equal to 0.8 mm and less than or equal to 2.5 mm.

9. The apparatus of claim 2, wherein a theoretical cylinder is defined by the radially inner surface of the circumferentially extending wall, wherein the flow altering structures are disposed on the radially inner surface of the circumferentially extending wall within a contiguous zone, and wherein the flow altering structures are sized and populated in the contiguous zone such that the flow altering structures in the contiguous zone are disposed on at least 50% of the surface area of the theoretical cylindrical surface that lies within the contiguous zone.

10. The apparatus of claim 9, wherein the flow altering structures are sized and populated in the contiguous zone such that the flow altering structures in the contiguous zone are disposed on at least 75% of the surface area of the theoretical cylindrical surface that lies within the contiguous zone.

11. The apparatus of claim 2, wherein each of the cavities has an aspect ratio that is defined by the equation:

$$AR = C/R$$

where: C is a maximum circumferential length of the cavity measured at the radially inner surface of the circumferentially extending wall; and R is a radial distance between a radially outer-most surface of the cavity and a surface of the rotor portion taken along a line that intersects a rotational axis of the disk; and wherein the aspect ratio (AR) is greater than or equal to 0.2 and less than or equal to 4.0.

12. The apparatus of claim 11, wherein the aspect ratio is greater than or equal to 0.25 and less than or equal to 2.75.

13. The apparatus of claim 12, wherein the aspect ratio is greater than or equal to 0.5 and less than or equal to 2.5.

14. The apparatus of claim 13, wherein the aspect ratio is greater than or equal to 1.0 and less than or equal to 1.5.

15. The apparatus of claim 1, wherein the plurality of flow altering structures number at least five (5) in quantity that are disposed on the circumferentially extending wall.

16. The apparatus of claim 1, wherein at least a portion of the plurality of flow altering structures are disposed on the circumferentially extending wall such that they are not evenly spaced about the circumference of the circumferentially extending wall.

17. The apparatus of claim 16, wherein none of the flow altering structures are disposed in a sector of the circumferentially extending wall that spans at least 70 degrees.

18. The apparatus of claim 1, wherein the flow altering structures comprise annular wall cavities formed in the first annular wall of the outer housing assembly.

19. The apparatus of claim 18, wherein the first concentric fluid grooves each define a flat annular root surface and wherein each of the annular wall cavities intersects at least one of the flat annular root surfaces.

20. The apparatus of claim 19, wherein each of the annular wall cavities has a cavity sidewall and a cavity bottom wall that is bounded by the cavity sidewall, and wherein at least a portion of the cavity bottom wall is parallel to the at least one of the flat annular root surfaces.

21. The apparatus of claim 19, wherein each of the annular wall cavities has a pair of opposite circumferential ends and wherein at least one of the circumferential ends is at least partly defined by a radius at a location where the circumferential end intersects an associated one of the flat annular root surfaces.

22. The apparatus of claim 19, wherein each of the annular wall cavities has a depth relative to an associated one of the flat annular root surfaces that is greater than or equal to 0.2 mm and less than or equal to 3.5 mm.

23. The apparatus of claim 22, wherein the depth of the annular wall cavities is greater than or equal to 0.5 mm and less than or equal to 2.8 mm.

24. The apparatus of claim 23, wherein the depth of the annular wall cavities is greater than or equal to 0.8 mm and less than or equal to 2.5 mm.

25. The apparatus of claim 19, wherein each of the annular wall cavities has a cavity sidewall and wherein at least a portion of the cavity sidewall is perpendicular to an associated one of the flat annular root surfaces at a location where the portion of the cavity sidewall intersects the associated one of the flat annular root surfaces.

26. The apparatus of claim 19, wherein the flow altering structures on the first annular wall are disposed within one or more zones, each of the zones being coincident with an associated one of the flat annular root surfaces and having a planar annular shape or an annular segment shape, and wherein the flow altering structures are sized and populated in the one or more zones such that the flow altering structures in the one or more zones are disposed over at least 50% of the surface area of the one or more zones.

27. The apparatus of claim 26, wherein the flow altering structures are sized and populated within the one or more zones such that the flow altering structures in the one or more zones are disposed on at least 75% of the surface area of the one or more zones.

28. The apparatus of claim 19, wherein each of the annular wall cavities has an aspect ratio that is defined by the equation:

$$AR = C/R$$

where: C is a maximum circumferential length of the annular wall cavity measured at an associated one of the flat annular root surfaces; and R is a maximum distance between a surface of the annular wall cavity and a surface of an associated one of the first concentric ribs taken parallel to an axis about which the disk rotates relative to the outer housing assembly; and wherein the aspect ratio (AR) is greater than or equal to 0.2 and less than or equal to 4.0.

29. The apparatus of claim 28, wherein the aspect ratio is greater than or equal to 0.25 and less than or equal to 2.75.

30. The apparatus of claim 29, wherein the aspect ratio is greater than or equal to 0.5 and less than or equal to 2.5.

31. The apparatus of claim 30, wherein the aspect ratio is greater than or equal to 1.0 and less than or equal to 1.5.

32. The apparatus of claim 1, wherein at least a portion of the plurality of flow altering structures are disposed on the first annular wall such that they are not evenly spaced about the circumference of the first annular wall.

33. The apparatus of claim 32, wherein none of the flow altering structures are disposed in a sector of the first annular wall that spans at least 70 degrees.

34. The apparatus of claim 1, further comprising a valve in fluid communication with the reservoir and the working cavity.

35. The apparatus of claim 34, wherein the valve is coupled to the disk for rotation therewith.

36. The apparatus of claim 1, wherein the working fluid comprises silicone.

37. The apparatus of claim 1, wherein the reservoir is at least partly defined by the disk.

38. A method comprising:
providing an apparatus having an outer housing assembly, a disk and a reservoir, the outer housing assembly having a working cavity, the disk being rotatable in the outer housing assembly, the disk having a rotor portion that is rotatably received in the working cavity, the working cavity being in fluid communication with the reservoir;
rotating the rotor within the outer housing assembly to generate a flow of a working fluid through the working cavity and to apply a shear force to the working fluid flowing through working cavity; and
inducing movement of the working fluid at a plurality of locations on the outer housing assembly in a direction that is transverse to a boundary layer of the working fluid that is adjacent to a first surface formed on the outer housing assembly.

39. The method of claim 38, wherein the first surface is formed on an annular wall of the outer housing assembly.

40. The method of claim 38, wherein the first surface is formed on a circumferentially extending wall of the outer housing assembly.

41. The method of claim 40, further comprising inducing disturbances in a laminar flow of the working fluid in a second area that is adjacent to a second surface of the working cavity as the working fluid passes through the working cavity during operation of the apparatus.

42. The method of claim 41, wherein the second surface is formed on an annular wall of the outer housing assembly.

43. The method of claim 38, further comprising forming a plurality of flow altering structures on the outer housing assembly.

44. The method of claim 43, wherein the flow altering structures are unitarily formed with a portion of the outer housing assembly that defines a plurality of concentric fluid grooves.

45. The method of claim 43, wherein the flow altering structures are cavities.

46. The method of claim 45, further comprising casting at least a portion of the outer housing assembly, wherein at least a portion of the cavities are formed on the portion of the outer housing assembly when the portion of the outer housing assembly is cast.

47. The method of claim 45, further comprising removing material from a portion of the outer housing assembly to form at least a portion of the cavities.

48. The method of claim 47, wherein material is removed from the portion of the outer housing assembly in an operation selected from a group consisting of: milling, drilling, etching, broaching, and electro-discharge machining.

49. The method of claim 38, further comprising forming a portion of the outer housing assembly in an operation selected from a group consisting of: stamping, embossing, forging, fine blanking and knurling to form one or more flow altering structures.

50. The method of claim 38, wherein the locations on the outer housing assembly are where the flow of the working fluid through the working cavity has a Reynolds number that is less than 100.

* * * * *